US007079937B2

(12) United States Patent
Tanaka

(10) Patent No.: US 7,079,937 B2
(45) Date of Patent: Jul. 18, 2006

(54) AIR QUANTITY ESTIMATION APPARATUS FOR INTERNAL COMBUSTION ENGINE

(75) Inventor: Satoru Tanaka, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 11/268,664

(22) Filed: Nov. 8, 2005

(65) Prior Publication Data

US 2006/0116808 A1 Jun. 1, 2006

(30) Foreign Application Priority Data

Nov. 29, 2004 (JP) ............................ 2004-343663

(51) Int. Cl.
*F02D 45/00* (2006.01)
*F02B 37/12* (2006.01)
*G01F 17/00* (2006.01)

(52) U.S. Cl. ...................... 701/102; 73/118.2; 73/117.3

(58) Field of Classification Search ................ 701/102, 701/103, 115; 73/117.3, 118.2
See application file for complete search history.

(56) References Cited

U.S. PATENT DOCUMENTS 6,435,023 B1 * 8/2002 Kobayashi et al. ........ 73/118.2
6,588,261 B1 * 7/2003 Wild et al. ................. 73/118.2
7,003,390 B1 * 2/2006 Kaga .......................... 701/101

FOREIGN PATENT DOCUMENTS

JP 62-265449 A * 11/1987
JP 62-265450 A * 11/1987
JP 06-026383 2/1994
JP 2001-041095 2/2001
JP 2001-516421 9/2001

* cited by examiner

*Primary Examiner*—Hieu T. Vo
(74) *Attorney, Agent, or Firm*—Oliff & Berridge, PLC

(57) ABSTRACT

An air quantity estimation apparatus for an internal combustion engine estimates intake pipe section pressure, which is pressure of air within an intake pipe section. When throttle valve opening is smaller than a threshold value, the apparatus estimates the intake pipe section pressure by use of an intercooler model constructed on the basis of conservation laws for air within the intercooler section and an intake pipe model constructed based on conservation laws for air within the intake pipe section. Meanwhile, when the throttle valve opening is greater than the threshold value, the apparatus estimates the intake pipe section pressure by use of an intercooler-intake pipe combined model constructed based on conservation laws for air within a combined section formed by combining the intercooler section and the intake pipe section. The apparatus estimates cylinder air quantity on the basis of the estimated intake pipe section pressure.

8 Claims, 15 Drawing Sheets

AIR QUANTITY ESTIMATION APPARATUS FOR INTERNAL COMBUSTION ENGINE

BACKGROUND OF THE INVENTION

1. Field of the Invention

The present invention relates to an apparatus for estimating the quantity of air introduced into a cylinder of an internal combustion engine.

2. Description of the Related Art

Conventionally, there has been known an air quantity estimation apparatus for an internal combustion engine equipped with a supercharger which estimates cylinder air quantity, which is the quantity of air introduced into a cylinder of the engine, by use of a physical model representing behavior of air within an intake passage (refer to, for example, Japanese Kohyo (PCT) Patent Publication No. 2001-516421).

One conventional apparatus of such a type estimates throttle valve downstream pressure P(t), which is the pressure of air as measured on the downstream side of a throttle valve and which changes with elapse of time t, on the basis of a differential equation (dP(t)/dt=f(mt(t))), wherein the time derivative term dP(t)/dt of the throttle valve downstream pressure P(t) is represented by a function f(mt(t)) whose variable is throttle-passing air flow rate mt(t), which is the quantity of air passing around the throttle valve per unit time and which changes with elapse of time t.

Incidentally, an apparatus of such a type generally estimates cylinder air quantity by use of a microcomputer which carries out numerical calculations composed of mainly four arithmetic operations. Therefore, estimation of throttle valve downstream pressure on the basis of the above-mentioned differential equation requires use of a mathematical formula which approximates the differential equation and whose solutions can be obtained by using four arithmetic operations. Such a mathematical formula is obtained by discretizing the differential equation. Difference method is known to be a useful method for such discretization.

According to the difference method, the time derivative term dP(t)/dt of the throttle valve downstream pressure P(t) is replaced with a value obtained by dividing by a predetermined time step Δt the difference (P(t2)−P(t1) between a throttle valve downstream pressure P(t1) at a certain time t1 and a throttle valve downstream pressure P(t2) at time t2, which is later than the time t1 by the predetermined time step Δt (that is, the amount of change in the throttle valve downstream pressure P(t) between times t1 and t2), the time step Δt being equal to t2−t1. Moreover, the value of the right-hand side function f(mt(t)) of the above-mentioned differential equation can be replaced with the value of a function f(mt(t1)) obtained by using the throttle-passing air flow rate mt(t1) at time t1. Through these approximations, the above-mentioned differential equation is converted to Equation (1) shown below, and Equation (2) is derived from Equation (1).

$$\{P(t2)-P(t1)\}/\Delta t=f(mt(t1)) \quad (1)$$

$$P(t2)=P(t1)+\Delta t\cdot f(mt(t1)) \quad (2)$$

Meanwhile, when the opposite sides of the above-mentioned differential equation are integrated from time t1 to time t2, there is derived the following Equation (3), which provides a mathematically exact solution of the differential equation.

$$P(t2)=P(t1)+\int f(mt(t))dt \text{ (integral interval: } t1\leqq t\leqq t2) \quad (3)$$

The above-described Equations (2) and (3) implies that the throttle valve downstream pressure P(t2) obtained from Equation (2) coincides with the throttle valve downstream pressure P(t2) obtained from Equation (3) when the product Δt·f(mt(t1)) of Equation (2) is equal to the integration of the function f(mt(t)) from time t1 to t2. That is, when the product Δt·f(mt(t1)) of Equation (2) is equal to the integration of the function f(mt(t)) of Equation (3) from time t1 to t2, the value of the function f(mt(t1)) is equal to the average value of the function f(mt(t)) from time t1 to time t2.

Accordingly, if the actual value of the function f(mt(t)), which represents the time derivative value of the throttle valve downstream pressure, does not change greatly during the time step Δt, the conventional apparatus can estimate the throttle valve downstream pressure with high accuracy.

In view of the above, the throttle-passing air flow rate mt(t) will be considered. FIG. 1 shows a change in the throttle-passing air flow rate mt(t) with the throttle valve downstream pressure P(t). A dotted curved line L1 of FIG. 1 shows the change in the case where the throttle valve opening is small, and a solid curved line L2 of FIG. 1 shows the change in the case where the throttle valve opening is large. The point PU of FIG. 1 indicates the pressure of air on the upstream side of the throttle valve (throttle valve upstream pressure).

In the case where the throttle valve opening is small, when a state in which the operation conditions (load, etc.) do not change (steady state) continues, the throttle valve downstream pressure P(t) converges to a steady value PL which is lower than the throttle valve upstream pressure PU. In this steady state, when the operation conditions change, the throttle valve downstream pressure P(t) changes mainly within a region A on the curve L1 of FIG. 1. That is, a change in the throttle-passing air flow rate mt(t) with a change in the throttle valve downstream pressure P(t) is very small. Accordingly, the actual value of the function f(mt(t)), which represents the time derivative value of the throttle valve downstream pressure P(t), does not change greatly, and thus, the conventional apparatus can estimate the throttle valve downstream pressure with high accuracy.

Meanwhile, when a steady state continues with the throttle valve opening being large, the throttle valve downstream pressure P(t) converges to a steady value PH which is approximately equal to the throttle valve upstream pressure PU. In this steady state, when the operation conditions change, the throttle valve downstream pressure P(t) changes mainly within a region B on the curve L2 of FIG. 1. That is, a change in the throttle-passing air flow rate mt(t) with a change in the throttle valve downstream pressure P(t) is very large. Accordingly, the actual value of the function f(mt(t)), which represents the time derivative value of the throttle valve downstream pressure P(t), changes greatly, and thus, the conventional apparatus cannot estimate the throttle valve downstream pressure with high accuracy.

A conceivable method for coping with the above-described problem is performing the calculation of the above-mentioned Equation (2) with the time step Δt being decreased. However, this method causes a problem that the calculation load of the microcomputer increases as the time step Δt decreases.

SUMMARY OF THE INVENTION

The present invention has been accomplished in order to cope with the above problems, and an object of the present invention is to provide an air quantity estimation apparatus for an internal combustion engine equipped with a supercharger, which apparatus can estimate cylinder air quantity accurately with avoiding an increase of calculation load.

In order to achieve the above-described object, the present invention provides an air quantity estimation apparatus which is applied to an internal combustion engine which includes an intake passage for introducing air taken from the outside of the engine into a cylinder; a supercharger disposed in the intake passage and including a compressor for compressing air within the intake passage; a throttle valve disposed in the intake passage to be located downstream of the supercharger, the opening of the throttle valve being adjustable for changing the quantity of air passing through the intake passage; and an intake valve disposed downstream of the throttle valve and driven to make a connection portion (intake port) between the intake passage and the cylinder into a communicating state or a blocked state. The air quantity estimation apparatus estimates cylinder air quantity, which is the quantity of air introduced into the cylinder, on the basis of a physical model representing the behavior of air passing through the intake passage.

Specifically, the air quantity estimation apparatus includes first pressure estimation means, second pressure estimation means, selection condition determination means, and cylinder air quantity estimation means.

The first pressure estimation means uses a throttle valve upstream section model, which is a physical model constructed on the basis of conservation laws (the mass conservation law and the energy conservation law) for air within a throttle valve upstream section (a portion of the intake passage between the supercharger and the throttle valve), and a throttle valve downstream section model, which is a physical model constructed on the basis of conservation laws (the mass conservation law and the energy conservation law) for air within a throttle valve downstream section (a portion of the intake passage between the throttle valve and the intake valve), whereby the first pressure estimation means estimates throttle valve upstream pressure, which is the pressure of air within the throttle valve upstream section, and throttle valve downstream pressure, which is the pressure of air within the throttle valve downstream section.

The second pressure estimation means uses a combined section model, which is a physical model constructed on the basis of conservation laws (the mass conservation law and the energy conservation law) for air within a combined section (a portion of the intake passage between the supercharger and the intake valve), whereby the second pressure estimation means estimates, as the throttle valve upstream pressure and the throttle valve downstream pressure, combined section pressure, which is the pressure of air within the combined section.

The selection condition determination means determines whether selection conditions are satisfied, including a throttle valve opening condition that the opening of the throttle valve (throttle valve opening) is greater than a predetermined threshold throttle valve opening.

When a determination is made that the selection conditions are not satisfied, the cylinder air quantity estimation means estimates the cylinder air quantity on the basis of the throttle valve downstream pressure estimated by means of the first pressure estimation means. When a determination is made that the selection conditions are satisfied, the cylinder air quantity estimation means estimates the cylinder air quantity on the basis of the throttle valve downstream pressure estimated by means of the second pressure estimation means.

More specifically, the air quantity estimation apparatus of the present invention is applied to an internal combustion engine which includes an intake passage for introducing air taken from the outside of the engine into a cylinder; a supercharger disposed in the intake passage and including a compressor for compressing air within the intake passage; a throttle valve disposed in the intake passage to be located downstream of the supercharger, the opening of the throttle valve being adjustable for changing the quantity of air passing through the intake passage; and an intake valve disposed downstream of the throttle valve and driven to make a connection portion (intake port) between the intake passage and the cylinder into a communicating state or a blocked state. The air quantity estimation apparatus estimates cylinder air quantity, which is the quantity of air introduced into the cylinder, on the basis of a physical model representing the behavior of air passing through the intake passage.

That is, the air quantity estimation apparatus includes throttle valve opening estimation means, throttle-passing air flow rate estimation means, first pressure estimation means, second pressure estimation means, selection condition determination means, and cylinder air quantity estimation means.

The throttle valve opening estimation means estimates an opening of the throttle valve at a predetermined first point in time.

The throttle-passing air flow rate estimation means estimates throttle-passing air flow rate, which is the flow rate of air flowing from the throttle valve upstream section to the throttle valve downstream section while passing around the throttle valve, at the first point in time on the basis of the throttle valve upstream pressure, which is the pressure of air within the throttle valve upstream section (a portion of the intake passage between the supercharger and the throttle valve), at the first point in time, the throttle valve downstream pressure, which is the pressure of air within the throttle valve downstream section (a portion of the intake passage between the throttle valve and the intake valve), at the first point in time, and the estimated opening of the throttle valve at the first point in time.

The first pressure estimation means estimates throttle valve upstream pressure and throttle valve downstream pressure at a second point in time later than the first point in time by use of the estimated throttle-passing air flow rate at the first point in time; the throttle valve upstream section model, which is a physical model constructed on the basis of conservation laws (the mass conservation law and the energy conservation law) for air within the throttle valve upstream section; the throttle valve downstream section model, which is a physical model constructed on the basis of conservation laws (the mass conservation law and the energy conservation law) for air within the throttle valve downstream section; the throttle valve upstream pressure at the first point in time; and the throttle valve downstream pressure at the first point in time.

The second pressure estimation means estimates combined section pressure, which is the pressure of air within the combined section (a portion of the intake passage between the supercharger and the intake valve), at the first point in time on the basis of the throttle valve upstream pressure at the first point in time and the throttle valve downstream pressure at the first point in time, and estimates, as throttle valve upstream pressure and throttle valve downstream pressure at the second point in time, combined section pressure at the second point in time on the basis of the estimated combined section pressure at the first point in time and a combined section model, which is a physical model constructed on the basis of conservation laws (the mass conservation law and the energy conservation law) for air within the combined section under the assumption that the combined section pressure is uniform within the combined section.

The selection condition determination means determines whether selection conditions are satisfied, including a throttle valve opening condition that the estimated opening of the throttle valve at the first point in time is greater than a predetermined threshold throttle valve opening.

When a determination is made that the selection conditions are not satisfied, the cylinder air quantity estimation means estimates the cylinder air quantity at the second point in time on the basis of the throttle valve downstream pressure at the second point in time estimated by means of the first pressure estimation means. When a determination is made that the selection conditions are satisfied, the cylinder air quantity estimation means estimates the cylinder air quantity at the second point in time on the basis of the throttle valve downstream pressure at the second point in time estimated by means of the second pressure estimation means.

According to the above-described configuration, when the throttle valve opening is smaller than the threshold throttle valve opening, the throttle valve downstream pressure, which is the pressure of air within the throttle valve downstream section, is estimated by use of the throttle valve upstream section model, which is a physical model constructed on the basis of conservation laws for air within the throttle valve upstream section (a portion of the intake passage between the supercharger and the throttle valve), and the throttle valve downstream section model, which is a physical model constructed on the basis of conservation laws for air within a throttle valve downstream section (a portion of the intake passage between the throttle valve and the intake valve). Meanwhile, when the throttle valve opening is greater than the threshold throttle valve opening, the throttle valve downstream pressure is estimated by use of the combined section model, which is a physical model constructed on the basis of conservation laws for air within a combined section (a portion of the intake passage between the supercharger and the intake valve). In either case, the cylinder air quantity is estimated on the basis of the estimated throttle valve downstream pressure.

Therefore, in a state in which, because of a relatively large throttle valve opening, the throttle-passing air flow rate (the flow rate of air passing around the throttle valve) is likely to change greatly within a short period of time with change in the pressure of air within the throttle valve upstream section (throttle valve upstream pressure) or the throttle valve downstream pressure, the throttle valve downstream pressure can be estimated by use of the combined model for which the throttle-passing air flow rate does not have to be assumed to be constant for a predetermined period of time. Therefore, the throttle valve downstream pressure can be estimated accurately with avoiding an increase of calculation load. As a result, the cylinder air quantity can be estimated accurately.

In this case, it is desirable that the threshold throttle valve opening is set to increase with the engine rotational speed.

As described previously, the air quantity estimation apparatus for an internal combustion engine according to the present invention estimates the throttle valve downstream pressure by use of the combined section model when the throttle valve opening is greater than the threshold throttle valve opening. Incidentally, the quantity of air introduced into the cylinder per unit time (cylinder air flow rate) increases with engine rotational speed. Therefore, even when the throttle valve opening is constant, the difference between the throttle valve upstream pressure and the throttle valve downstream pressure (throttle valve upstream-downstream pressure difference) increases.

Accordingly, in the case where the threshold throttle valve opening is kept constant irrespective of engine rotational speed, the above-described combined section model may be used in a state in which the throttle valve upstream-downstream pressure difference is large. In such a case, the assumption (the throttle valve upstream pressure and the throttle valve downstream pressure being substantially equal to each other), which is used for construction of the combined model, is not satisfied in actuality, and thus the throttle valve downstream pressure cannot be estimated accurately.

In contrast, according to the above-described configuration, since the threshold throttle valve opening of the throttle valve opening conditions is set to increase with engine rotational speed, when the throttle valve opening is greater than the threshold throttle valve opening, the throttle valve upstream-downstream pressure difference has become sufficiently small, irrespective of engine rotational speed. Accordingly, the above-described assumption is satisfied, so that the throttle valve downstream pressure can be estimated accurately by use of the combined model.

In this case, it is desirable that the selection conditions include a pressure difference condition that the difference between the throttle valve upstream pressure and the throttle valve downstream pressure is smaller than a predetermined value.

When the throttle valve opening changes, the throttle valve upstream pressure and the throttle valve downstream pressure change with time delay. Accordingly, in some cases, there is a considerable difference between the throttle valve upstream pressure and the throttle valve downstream pressure even when the throttle valve opening is greater than the threshold throttle valve opening. In such a case, use of the combined section model results in failure to estimate the throttle valve downstream pressure with high accuracy, because the assumption (the assumption that the throttle valve upstream pressure and the throttle valve downstream pressure are substantially equal to each other), which is used for construction of the combined model, is not satisfied in actuality.

In contrast, by virtue of the above-described configuration, the combined section model is used only when the throttle valve upstream-downstream pressure difference is smaller than a predetermined value. Accordingly, since the combined section model is used only when the above-described assumption is satisfied, the throttle valve downstream pressure can be estimated more accurately.

BRIEF DESCRIPTION OF DRAWINGS

Various other objects, features, and many of the attendant advantages of the present invention will be readily appreciated as the same becomes better understood by reference to the following detailed description of the preferred embodiment when considered in connection with the accompanying drawings, in which.

DETAILED DESCRIPTION OF PREFERRED EMBODIMENT

Figure 1:
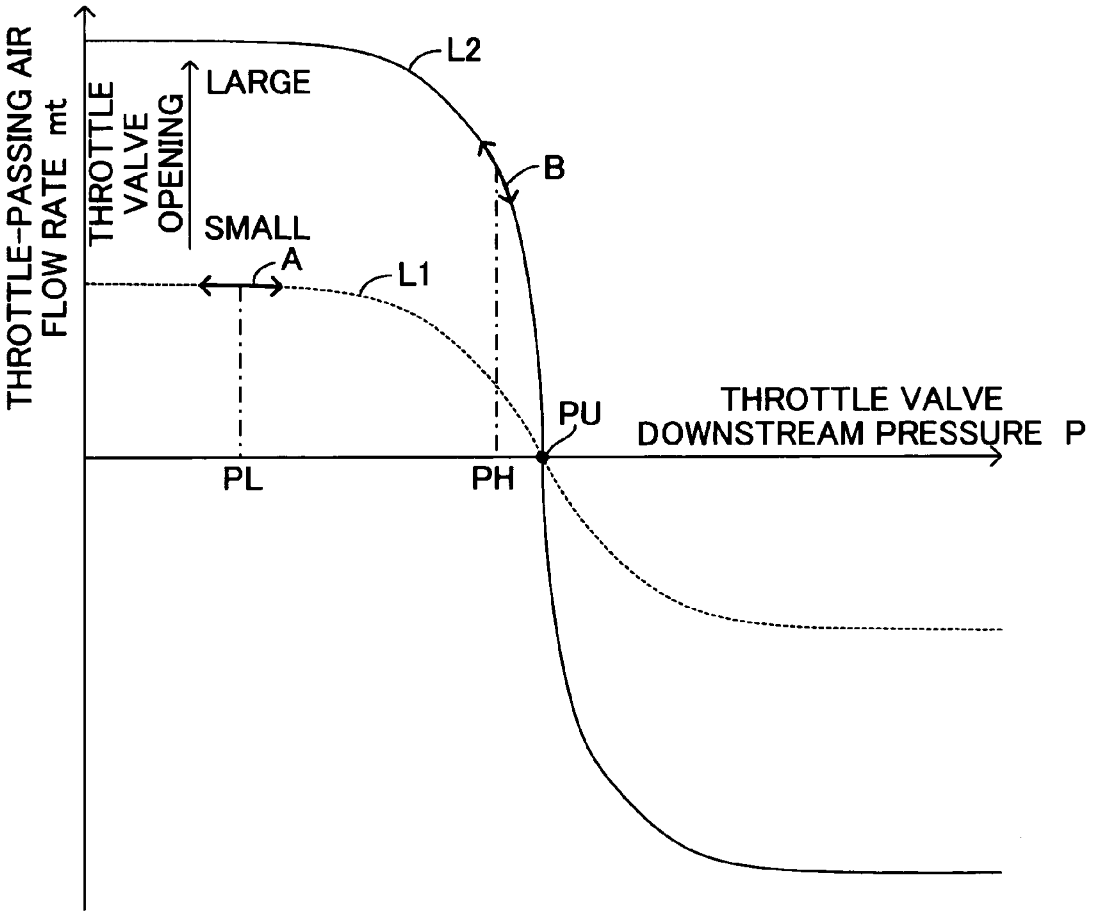
FIG. 1 is a graph showing changes in throttle-passing air flow rate with throttle valve downstream pressure.
Figure 2:
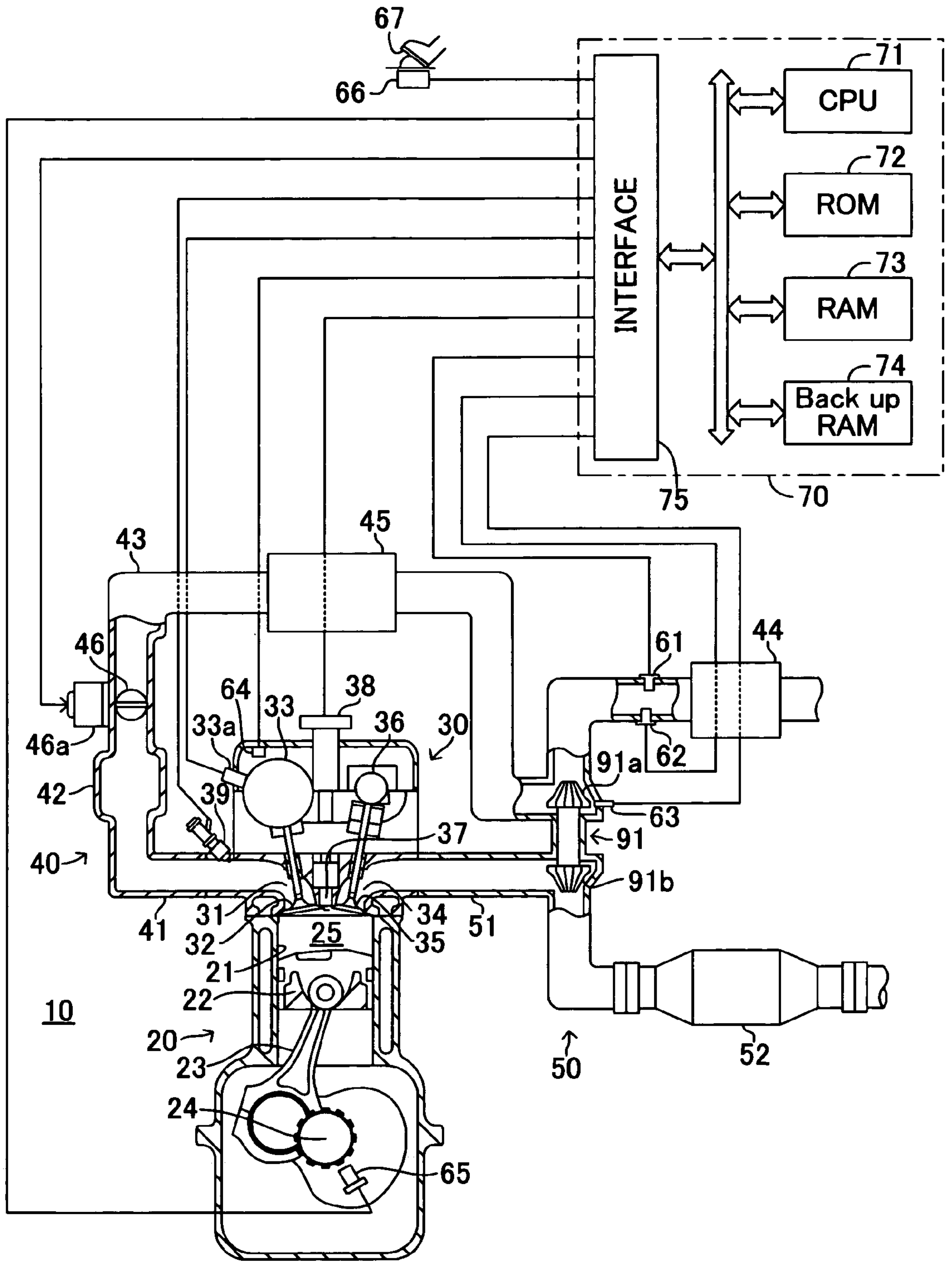
FIG. 2 is a schematic configuration diagram of a system configured such that an air quantity estimation apparatus according to an embodiment of the present invention is applied to a spark-ignition multi-cylinder internal combustion engine.

An air quantity estimation apparatus for an internal combustion engine according to an embodiment of the present invention will be described with reference to the drawings. FIG. 2 shows a schematic configuration of a system configured such that the air quantity estimation apparatus according to the present embodiment is applied to a spark-ignition multi-cylinder (e.g., 4-cylinder) internal combustion engine 10. Notably, FIG. 2 shows only a cross section of a specific cylinder; however the remaining cylinders have the same configuration.

The internal combustion engine 10 includes a cylinder block section 20 including a cylinder block, a cylinder block lower-case, an oil pan, etc.; a cylinder head section 30 fixed on the cylinder block section 20; an intake system 40 for supplying air-fuel mixture to the cylinder block section 20; and an exhaust system 50 for emitting exhaust gas from the cylinder block section 20 to the exterior of the engine 10.

The cylinder block section 20 includes cylinders 21, pistons 22, connecting rods 23, and a crankshaft 24. Each piston 22 reciprocates within the corresponding cylinder 21. The reciprocating motion of the piston 22 is transmitted to the crankshaft 24 via the corresponding connecting rod 23, whereby the crankshaft 24 rotates. The cylinder 21 and the head of the piston 22, together with the cylinder head section 30, form a combustion chamber 25.

The cylinder head section 30 includes, for each cylinder 21, an intake port 31 communicating with the combustion chamber 25; an intake valve 32 for opening and closing the intake port 31; a variable intake timing unit 33 including an intake cam shaft for driving the intake valve 32, the unit 33 being able to continuously change the phase angle of the intake cam shaft; an actuator 33*a* of the variable intake timing unit 33; an exhaust port 34 communicating with the combustion chamber 25; an exhaust valve 35 for opening and closing the exhaust port 34; an exhaust cam shaft 36 for driving the exhaust valve 35; a spark plug 37; an igniter 38 including an ignition coil for generating a high voltage to be applied to the spark plug 37; and an injector 39 for injecting fuel into the intake port 31.

The intake system 40 includes an intake manifold 41 communicating with the intake ports 31; a surge tank 42 communicating with the intake manifold 41; an intake duct 43 having one end connected to the surge tank 42 and forming an intake passage together with the intake ports 31, the intake manifold 41, and the surge tank 42; and an air filter 44, a compressor 91*a* of a supercharger 91, an intercooler 45, a throttle valve 46, and a throttle valve actuator 46*a*, which are disposed in the intake duct 43 in this order from the other end of the intake duct 43 toward the downstream side (the surge tank 42). Notably, the intake passage from the outlet (downstream) of the compressor 91*a* to the throttle valve 46 constitutes an intercooler section (throttle valve upstream section) together with the intercooler 45. Further, the intake passage from the throttle valve 46 to the intake valve 32 constitutes an intake pipe section (throttle valve downstream section). Further, the intake passage from the outlet (downstream) of the compressor 91*a* to the intake valve 32 (the intercooler section and the intake pipe section) constitutes a combined section.

The intercooler 45 is of an air cooling type, and is configured to cool air flowing through the intake passage by means of air outside the internal combustion engine 10.

The throttle valve 46 is rotatably supported by the intake duct 43 and is driven by the throttle valve actuator 46*a* for adjustment of opening. According to this configuration, the throttle valve 46 can change the cross sectional area of the passage of the intake duct 43. The opening of the throttle valve 46 (throttle valve opening) is defined as a rotational angle from the position of the throttle valve 46 where the cross sectional area of the passage is minimized.

The throttle valve actuator 46*a*, which is composed of a DC motor, drives the throttle valve 46 such that the actual throttle valve opening θta becomes equal to a target throttle valve opening θtt, in accordance with a drive signal which an electric control apparatus 70 to be described later sends by accomplishing the function of an electronic control throttle valve logic to be described later.

The exhaust system 50 includes an exhaust pipe 51 including an exhaust manifold communicating with the exhaust ports 34 and forming an exhaust passage together with the exhaust ports 34; a turbine 91*b* of the supercharger 91 disposed within the exhaust pipe 51; and a 3-way catalytic unit 52 disposed in the exhaust pipe 51 to be located downstream of the turbine 91*b*.

According to such an arrangement, the turbine 91*b* of the supercharger 91 is rotated by means of energy of exhaust gas. Further, the turbine 91*b* is connected to the compressor 91*a* of the intake system 40 via a shaft. Thus, the compressor 91*a* of the intake system 40 rotates together with the turbine 91*b* and compresses air within the intake passage. That is, the supercharger 91 supercharges air into the internal combustion engine 10 by utilizing energy of exhaust gas.

Meanwhile, this system includes a pressure sensor 61; a temperature sensor 62; a compressor rotational speed sensor 63 as compressor rotational speed detection means; a cam position sensor 64; a crank position sensor 65; an accelerator opening sensor 66 as operation state quantity obtaining means; and the above-mentioned electric control apparatus 70.

The pressure sensor 61 is disposed in the intake duct 43 to be located between the air filter 44 and the compressor 91*a*. The pressure sensor 61 detects the pressure of air within the intake duct 43, and outputs a signal representing intake air pressure Pa, which is the pressure of air within the intake passage upstream of the compressor 91*a*. The temperature sensor 62 is disposed in the intake duct 43 to be located between the air filter 44 and the compressor 91*a*. The temperature sensor 62 detects the temperature of air within the intake duct 43, and outputs a signal representing intake air temperature Ta, which is the temperature of air within the intake passage upstream of the compressor 91*a*. The compressor rotational speed sensor 63 outputs a signal every time the rotational shaft of the compressor 91*a* rotates by 360 degrees. This signal represents compressor rotational speed Ncm. The cam position sensor 64 generates a signal (G2 signal) having a single pulse every time the intake cam shaft rotates by 90 degrees (i.e., every time the crankshaft 24 rotates by 180 degrees). The crank position sensor 65 outputs a signal having a narrow pulse every time the crankshaft 24 rotates by 10 degrees and having a wide pulse every time the crankshaft 24 rotates by 360 degrees. This signal represents engine rotational speed NE. The accelerator opening sensor 66 detects an operation amount of an accelerator pedal 67 operated by a driver, and outputs a signal representing the operation amount of the accelerator pedal (accelerator pedal operation amount) Accp.

The electric control apparatus 70 is a microcomputer including a CPU 71; a ROM 72 that stores in advance programs for the CPU 71 to execute, tables (lookup tables and maps), constants, and others; a RAM 73 for the CPU 71 to temporarily store data if necessary; backup RAM 74 that stores data in a state in which power is turned on and also holds the stored data while power is turned off; and an interface 75 including AD converters, which are mutually connected via a bus. The interface 75 is connected to the above-mentioned sensors 61 to 66, supplies signals from the sensors 61 to 66 to the CPU 71, and sends drive signals (instruction signals) to the actuator 33*a* of the variable intake timing unit 33, the igniter 38, the injector 39, and the throttle valve actuator 46*a* according to instructions of the CPU 71.

Next will be described the method by which the air quantity estimation apparatus for an internal combustion engine configured as described above estimates cylinder air quantity.

In the internal combustion engine 10 to which the present air quantity estimation apparatus is applied, since the injector 39 is disposed upstream of the intake valve 32, fuel must be injected before a time (intake valve closure time) at which an intake stroke ends by closing the intake valve 32. Accordingly, in order to determine a fuel injection amount required to form an air-fuel mixture within a cylinder of which air-fuel ratio coincides with a target air-fuel ratio, the present air quantity estimation apparatus must estimate cylinder air quantity at the time of closure of the intake valve, at a predetermined point in time before fuel injection.

In view of the above, by use of physical models constructed on the basis of physical laws such as the energy conservation law, the momentum conservation law, and the mass conservation law, the present air quantity estimation apparatus estimates the pressure and temperature of air within the intercooler section, as well as the pressure and temperature of air within the intake pipe section, at a point in time after the present time (hereinafter may be referred to as a "future point"), and estimates the cylinder air quantity at the future point on the basis of the estimated pressure and temperature of air within the intercooler section at the future point, as well as the estimated pressure and temperature of air within the intake pipe section at the future point.

Figure 3:
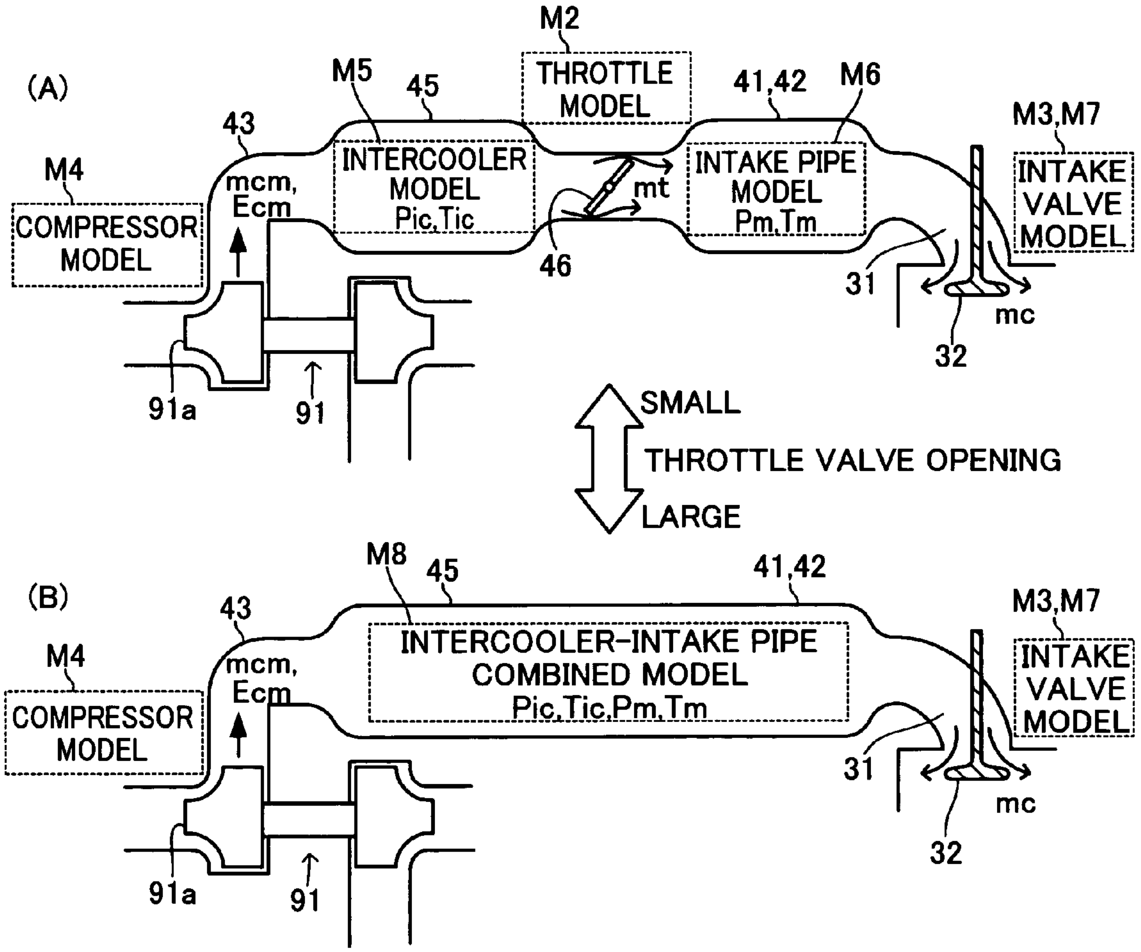
FIG. 3 is a pair of schematic diagrams showing various models for estimating cylinder air quantity which are selectively used in accordance with throttle valve opening.

When the throttle valve opening is smaller than a predetermined threshold throttle valve opening, as shown in FIG. 3(A), the present air quantity estimation apparatus employs a physical model (an intercooler model M5 to be described later) constructed on the basis of the conservation laws for air within the intercooler section and a physical model (an intake pipe model M6 to be described later) constructed on the basis of the conservation laws for air within the intake pipe section, as physical models for estimating the pressure Pic and temperature Tic of air within the intercooler section at the future point and the pressure Pm and temperature Tm of air within the intake pipe section at the future point.

Meanwhile, when the throttle valve opening is greater than the threshold throttle valve opening, as described above, the flow rate of air passing around the throttle valve 46 (throttle-passing air flow rate) tends to change greatly within a short period of time because of changes in the pressure of air within the intercooler section and the pressure of air within the intake pipe section. In view of this, when the throttle valve opening is greater than the threshold throttle valve opening, as shown in FIG. 3(B), the present air quantity estimation apparatus employs a physical model (intercooler-intake pipe combined model (IC-intake pipe combined model) M8 to be described later) constructed on the basis of the conservation laws for air within the combined section, as a physical model for estimating the pressure Pic and temperature Tic of air within the intercooler section at the future point and the pressure Pm and temperature Tm of air within the intake pipe section at the future point.

As described above, the present air quantity estimation apparatus selects a physical model(s) in accordance with the throttle valve opening, and estimates the cylinder air quantity by use of the selected physical model(s). Therefore, the present air quantity estimation apparatus can estimate the cylinder air quantity with high accuracy.

Figure 4:
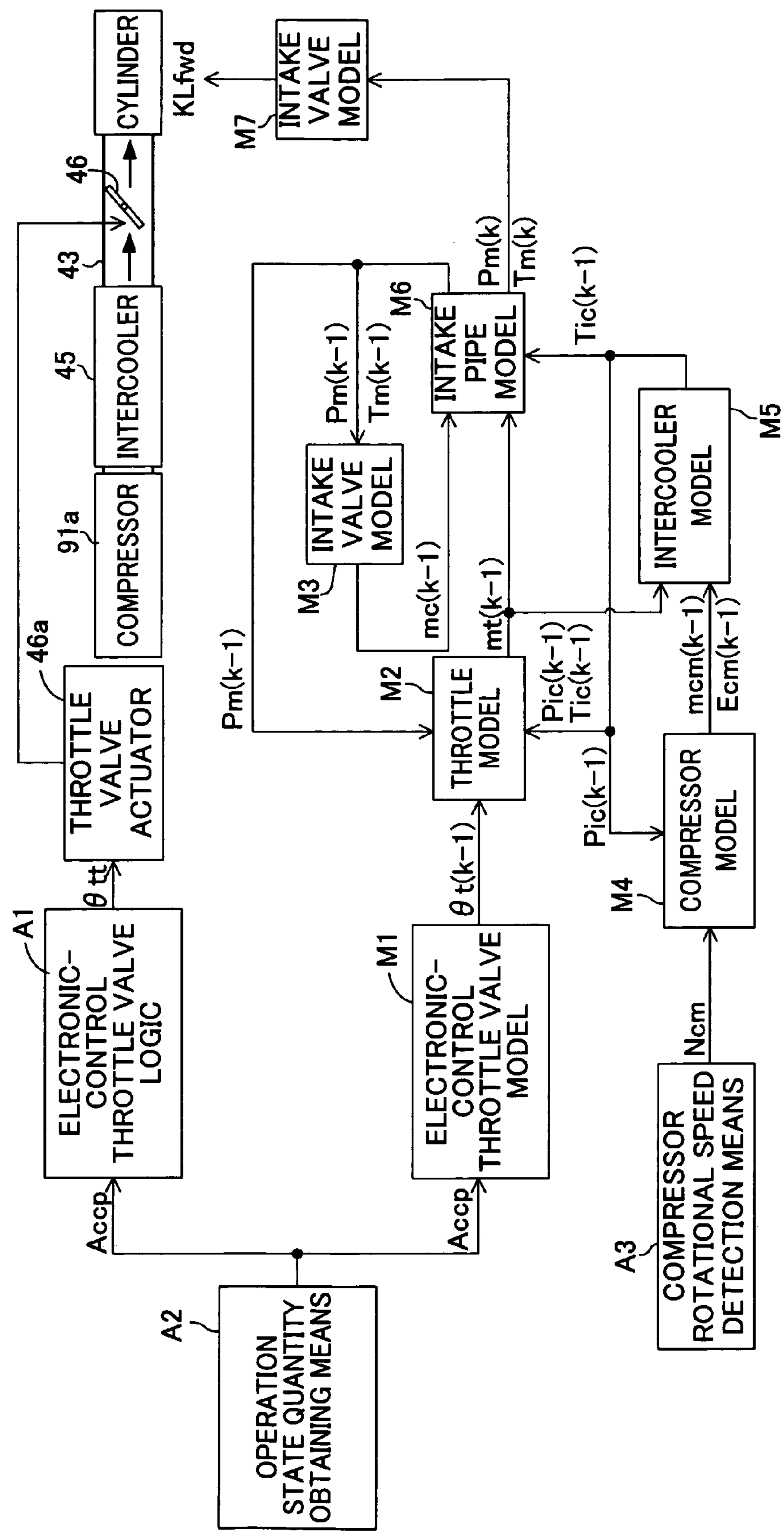
FIG. 4 is a functional block diagram of logic and various models for controlling the throttle valve opening and for estimating cylinder air quantity by use of an intercooler model and an intake pipe model.

More specifically, when the throttle valve opening is smaller than the threshold throttle valve opening, the present air quantity estimation apparatus estimates the cylinder air quantity by use of an electronic-control throttle valve model M1, a throttle model M2, an intake valve model M3, a compressor model M4, the intercooler model (throttle valve upstream section model) M5, the intake pipe model (throttle valve downstream section model) M6, an intake valve model M7, and an electronic-control throttle valve logic A1 shown in FIG. 4.

Figure 5:
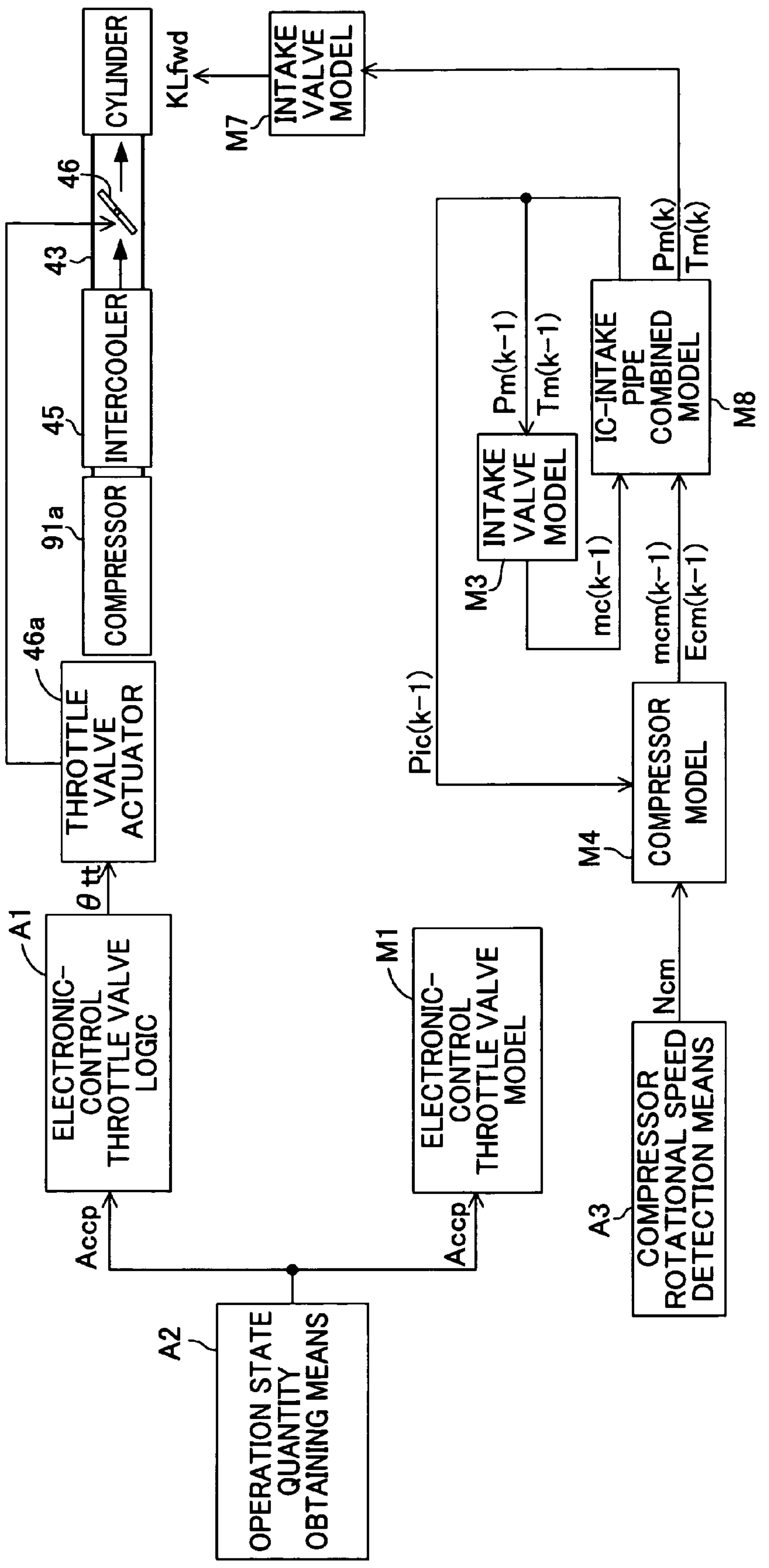
FIG. 5 is a functional block diagram of logic and various models for controlling the throttle valve opening and for estimating cylinder air quantity by use of an intercooler-intake pipe combined model.

Meanwhile, when the throttle valve opening is greater than the threshold throttle valve opening, the present air quantity estimation apparatus estimates the cylinder air quantity by use of the electronic-control throttle valve model M1, the intake valve model M3, the compressor model M4, the intake valve model M7, the IC-intake pipe combined model (combined section model) M8, and the electronic-control throttle valve logic A1 shown in FIG. 5. In this case, the throttle model M2, the intercooler model M5, and the intake pipe model M6 of FIG. 4 are replaced with the IC-intake pipe combined model M8.

Notably, the models M2 to M8 (the throttle model M2, the intake valve model M3, the compressor model M4, the intercooler model M5, the intake pipe model M6, the intake valve model M7, and the IC-intake pipe combined model M8) are represented by mathematical formulas (hereinafter also referred to as "generalized mathematical formulas") which are derived from the above-mentioned physical laws and which represent behavior of air at a certain point in time.

Therefore, when a value at a "certain point in time" is to be obtained, all values (variables) used in the generalized mathematical formulas must be values at the certain point in time. That is, when a certain model is represented by a generalized mathematical formula $y=f(x)$ and the value of y at a specific point in time later than the present time is to be obtained, the variable x must be set to a value at the specific point in time.

Incidentally, as described above, the cylinder air quantity to be obtained by use of the present air quantity estimation apparatus is one at a future point in time later than the present time (calculation point in time). Accordingly, as described below, the throttle valve opening θt, the compressor rotational speed Ncm, the intake air pressure Pa, the intake air temperature Ta, the engine rotational speed NE, the open-close timing VT of the intake valve 32, etc., which are used in the models M2 to M8, must be values at a future point in time later than the present time.

Therefore, the present air quantity estimation apparatus delays, from the point in time at which the apparatus determines a target throttle valve opening, the timing at which the apparatus controls the throttle valve 46 such that the opening of the throttle valve 46 coincides with the determined target throttle valve opening, to thereby estimate the throttle valve opening in a period from the present point in time to the future point in time (a period from the present point in time to a throttle valve opening estimatable point in time which is after the present point in time (in the present example, a point in time after elapse of a delay time TD from the present point in time)).

Further, the compressor rotational speed Ncm, the intake air pressure Pa, the intake air temperature Ta, the engine rotational speed NE, and the open-close timing VT of the intake valve 32 do not greatly change within a short period of time from the present point in time to a future point in time for which the cylinder air quantity is estimated. Therefore, the present air quantity estimation apparatus uses, in the above-mentioned generalized mathematical formulas, the compressor rotational speed Ncm, the intake air pressure Pa, the intake air temperature Ta, the engine rotational speed NE, and the open-close timing VT of the intake valve 32 at the present point in time as those at the future point in time.

As described above, the present air quantity estimation apparatus estimates the cylinder air quantity at a future point in time later than the present point in time on the basis of the estimated throttle valve opening θt at the future point in time later than the present time, the models M2 to M8, and the compressor rotational speed Ncm, the intake air pressure Pa, the intake air temperature Ta, the engine rotational speed NE, and the open-close timing VT of the intake valve 32, which are values at the present point in time.

Further, as described later, some of the generalized mathematical formulas representing the models M2 to M8 include time derivative terms regarding state quantities such as the pressure Pic and temperature Tic of air within the intercooler section and the pressure Pm and temperature Tm of air within the intake pipe section. In order to estimate the cylinder air quantity at the future point in time after the present point in time by use of the mathematical formulas including the time derivative terms, the present air quantity estimation apparatus uses mathematical formulas obtained by discretizing the generalized mathematical formulas by means of difference method so as to estimate, on the basis of the state quantities at a certain point in time, state quantities at a future point in time after elapse of a predetermined very short time (time step Δt) after the certain point in time.

Through repetition of such estimation, the present air quantity estimation apparatus estimates state quantities at subsequent future points. That is, the present air quantity estimation apparatus successively estimates state quantities at every point when the very short time elapses by repeating the estimation of the state quantities using the models M2 to M8. Notably, in the following description, variables representing respective state quantities and accompanied by a suffix (k−1) are variables representing respective state quantities which were estimated at the (k−1)-th estimation time (previous calculation point in time). Further, variables representing respective state quantities and accompanied by a suffix (k) are variables representing respective state quantities which were estimated at the k-th estimation time (present calculation point in time).

Next, the models and logic shown in FIG. 4, which the present air quantity estimation apparatus uses when the throttle valve opening is smaller than the threshold throttle valve opening, will be described specifically. Notably, since procedures of deriving equations representing the throttle model M2, the intake valve model M3, the intake pipe model M6, and the intake valve model M7 are well known (see Japanese Patent Application Laid-Open (kokai) No. 2001-41095 and 2003-184613), their detailed descriptions are omitted in the present specification.

[Electronic-Control Throttle Valve Model M1 and Electronic-Control Throttle Valve Logic A1]

The electronic-control throttle valve model M1 cooperates with the electronic-control throttle valve logic A1 so as to estimate the throttle valve opening θt at points up to the throttle valve opening estimatable point on the basis of the accelerator pedal operation amount Accp at points up to the present point in time.

Figure 6:
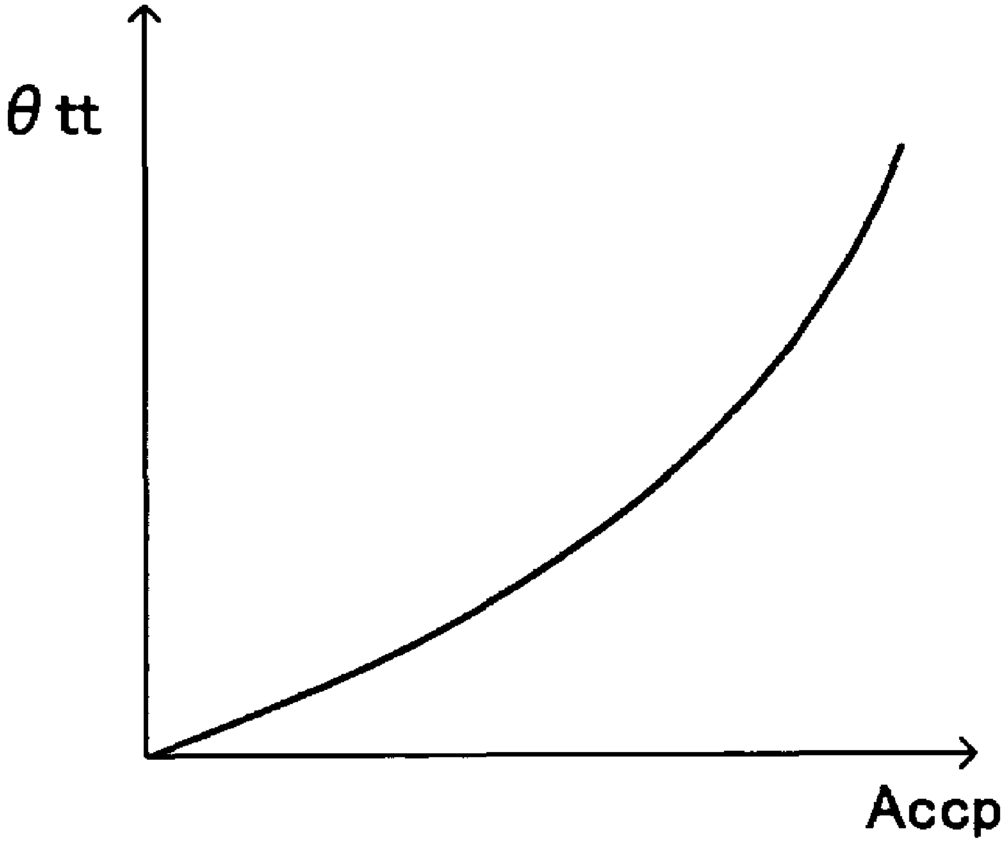
FIG. 6 is a graph showing the relation between accelerator pedal operation amount and target throttle valve opening, the relation being stored in the form of a table and being referenced by the CPU shown in FIG. 2.
Figure 7:
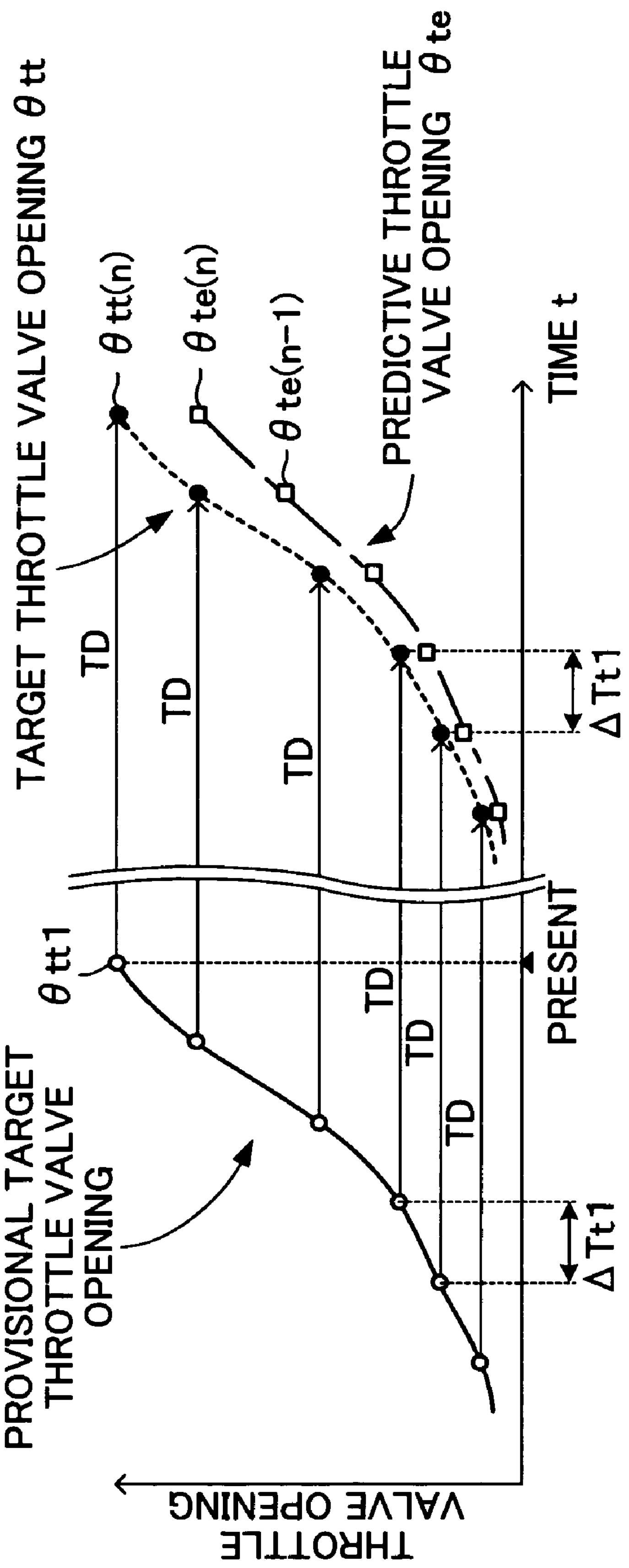
FIG. 7 is a time chart showing changes in provisional target throttle valve opening, target throttle valve opening, and predictive throttle valve opening.

More specifically, every time a predetermined time ΔTt1 (in the present example, 2 ms) elapses, the electronic-control throttle valve logic A1 determines a provisional target throttle valve opening θtt1 on the basis of the actual accelerator pedal operation amount Accp detected by the accelerator opening sensor 66 and the table defining the relationship between the accelerator pedal operation amount Accp and the target throttle valve opening θtt as shown in FIG. 6. Further, as shown in FIG. 7, which is a time chart, the electronic-control throttle valve logic A1 stores the provisional target throttle valve opening θtt1 as a target throttle valve opening θtt at a point in time (throttle valve opening estimatable point in time) after elapse of a predetermined delay time TD (in the present example, 64 ms). That is, the electronic-control throttle valve logic A1 uses, as the target throttle valve opening θtt at the present point in time, the provisional target throttle valve opening θtt1 detected at a point in time which is before the present point in time by the predetermined delay time TD. The electronic-control throttle valve logic A1 then outputs a drive signal to the throttle valve actuator 46*a* such that the throttle valve opening θta at the present point in time coincides with the target throttle valve opening θtt at the present point in time.

Incidentally, when the above-described drive signal is sent from the electronic-control throttle valve logic A1 to the throttle valve actuator 46*a*, the actual throttle valve opening θta follows the target throttle valve opening θtt with some delay, due to delay in operation of the throttle valve actuator 46*a* and inertia of the throttle valve 46. In view of this, the electronic-control throttle valve model M1 estimates (predicts) a throttle valve opening after elapse of the delay time TD on the basis of the following Equation (4) (see FIG. 7).

$$\theta te(n)=\theta te(n-1)+\Delta Tt1\cdot g(\theta tt(n),\ \theta te(n-1)) \tag{4}$$

Figure 8:
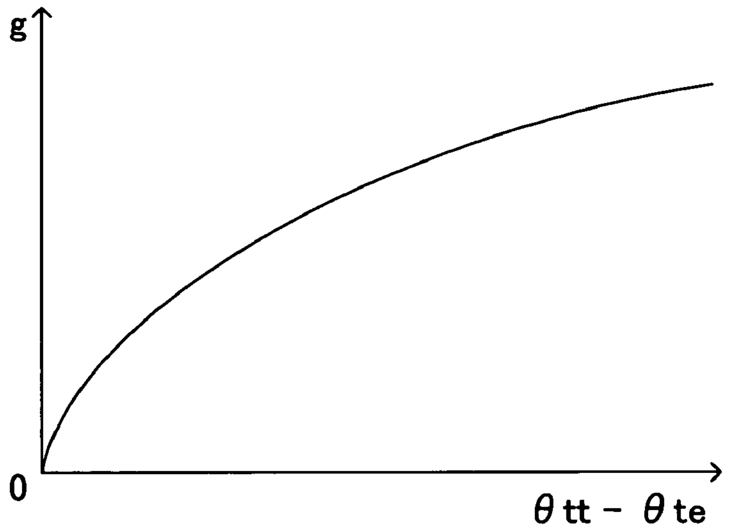
FIG. 8 is a graph showing a function used for calculation of predictive throttle valve opening.

In Equation (4), θte(n) is a predictive throttle valve opening θte newly estimated at the present calculation point in time, θtt(n) is a target throttle valve opening θtt newly set at the present calculation point in time, and θte(n−1) is a predictive throttle valve opening θte having already been estimated before the present calculation point in time (that is, a predictive throttle valve opening θte newly estimated at the previous calculation point in time). Further, as shown in FIG. 8, the function g(θtt, θte) has a value that increases with the difference Δθ between θtt and θte (Δθ=θtt−θte); i.e., the function g monotonously increases in relation to Δθ.

As described above, the electronic-control throttle valve model M1 newly determines at the present calculation point in time a target throttle valve opening θtt at the above-mentioned throttle valve opening estimatable point in time (a point in time after elapse of the delay time TD from the present point in time); newly estimates a throttle valve opening θte at the throttle valve opening estimatable point in time; and memorizes (stores) respective values of the target throttle valve opening θtt and the predictive throttle valve opening θte up to the throttle valve opening estimatable point in time in the RAM 73 while relating them to the elapse of time from the present point in time. Notably, in the case where the actual throttle valve opening θta coincides with the target throttle valve opening θtt with a negligible delay after the drive signal is sent to the throttle valve actuator 46*a*, the throttle valve opening may be estimated by use of an equation (θte(n)=θtt(n)) in place of the above-described Equation (4).

[Throttle Model M2]

The throttle model M2 estimates the flow rate mt of air passing around the throttle valve 46 (throttle-passing air flow rate) in accordance with Equations (5), (6-1), and (6-2) below, which are generalized mathematical formulas representing the present model, and obtained on the basis of physical laws, such as the energy conservation law, the momentum conservation law, the mass conservation law, and the state equation. In Equation (5), Ct(θt) is the flow rate coefficient, which varies with the throttle valve opening θt; At(θt) is a throttle opening area (the cross sectional area of opening around the throttle valve 46 within the intake passage), which varies with the throttle valve opening θt; Pic is intercooler section pressure, which is the pressure of air within the intercooler section (that is, throttle valve upstream pressure, which is the pressure of air within the intake passage between the supercharger 91 and the throttle valve 46); Pm is intake pipe section pressure, which is the pressure of air within the intake pipe section (that is, throttle valve downstream pressure, which is the pressure of air within the intake passage between the throttle valve 46 and the intake valve 32); Tic is intercooler section temperature, which is the temperature of air within the intercooler section (that is, throttle valve upstream temperature, which is the temperature of air within the intake passage between the supercharger 91 and the throttle valve 46); R is the gas constant; and κ is the ratio of specific heat of air (hereinafter, κ is handled as a constant value).

$$mt = Ct(\theta t)\cdot At(\theta t)\cdot \frac{Pic}{\sqrt{R\cdot Tic}}\cdot \Phi(Pm/Pic) \tag{5}$$

$$\Phi(Pm/Pic) = \sqrt{\frac{\kappa}{2\cdot(\kappa+1)}}$$

$$\text{for the case where } \frac{Pm}{Pic} \leq \frac{1}{\kappa+1} \tag{6-1}$$

$$\Phi(Pm/Pic) = \sqrt{\left\{\frac{\kappa-1}{2\kappa}\left(1-\frac{Pm}{Pic}\right)+\frac{Pm}{Pic}\right\}\left(1-\frac{Pm}{Pic}\right)}$$

$$\text{for the case where } \frac{Pm}{Pic} > \frac{1}{\kappa+1} \tag{6-2}$$

Here, it is known that the product Ct(θt)·At(θt) of the flow rate coefficient Ct(θt) and the throttle opening area At(θt) on the right-hand side of Equation (5) is empirically determined on the basis of the throttle valve opening θt. In view of this, the throttle model M2 stores in the ROM 72 a table MAPCTAT which defines the relationship between the throttle valve opening θt and the value of Ct(θt)·At(θt), and obtains the value of Ct(θte)·At(θte) (=MAPCTAT(θte)) on the basis of the predictive throttle valve opening θte estimated by means of the electronic-control throttle valve model M1.

Further, the throttle model M2 stores in the ROM 72 a table MAPΦ which defines the relationship between the value of Pm/Pic and the value of Φ(Pm/Pic), and obtains the value of Φ(Pm(k−1)/Pic(k−1)) (=MAPΦ(Pm(k−1)/Pic(k−1))) from the table MAPΦ and the value of Pm(k−1)/Pic(k−1) obtained by dividing the value of the intake pipe section pressure Pm(k−1) estimated at the (k−1)-th estimation time using the intake pipe model M6 by the value of the intercooler section pressure Pic(k−1) estimated at the (k−1)-th estimation time using the intercooler model M5.

The throttle model M2 obtains the throttle-passing air flow rate mt(k−1) by applying to the above-mentioned Equation (5) the value of Φ(Pm(k−1)/Pic(k−1)) obtained as described above and the intercooler section pressure Pic(k−1) and the intercooler section temperature Tic(k−1) estimated at the (k−1)-th estimation time by means of the intercooler model M5.

[Intake Valve Model M3]

The intake valve model M3 estimates the cylinder flow-in air flow rate mc, which is the flow rate of air flowing into the cylinder (into the combustion chamber 25) after passing around the intake valve 32, from the intake pipe section pressure Pm, which is the pressure of air within the intake pipe section, and the intake pipe section temperature (that is, throttle valve downstream temperature, which is the temperature of air within the intake passage between the throttle valve 46 and the intake valve 32) Tm, etc. The pressure within the cylinder in the intake stroke (including the point in time of closure of the intake valve 32) can be regarded as the pressure on the upstream side of the intake valve 32; i.e., the intake pipe section pressure Pm. Therefore, the cylinder flow-in air flow rate mc can be considered to be proportional to the intake pipe section pressure Pm at the point in time of closure of the intake valve. In view of this, the intake valve model M3 obtains the cylinder flow-in air flow rate mc in accordance with the following Equation (8), which is a generalized mathematical formula representing the present model and is based on a rule of thumb.

$$mc=(Ta/Tm)\cdot(c\cdot Pm-d) \tag{8}$$

In Equation (8), c is a proportion coefficient; and d is a constant reflecting the quantity of burned gas remaining within the cylinder. The value of the coefficient c can be obtained from the engine rotational speed NE at the present point in time, the open-close timing VT of the intake valve 32 at the present point in time, and a table MAPC which defines the relationship between the engine rotational speed NE and the open-close timing VT of the intake valve 32, and the value of the coefficient c (c=MAPC(NE, VT)). The intake valve model M3 stores the table MAPC in the ROM 72. Similarly, the value d can be obtained from the engine rotational speed NE at the present point in time, the open-close timing VT of the intake valve 32 at the present point in time, and a table MAPD which defines the relationship between the engine rotational speed NE and the open-close timing VT of the intake valve 32, and the value of the constant d (d=MAPD(NE, VT)). The intake valve model M3 stores the table MAPD in the ROM 72.

The intake valve model M3 obtains the cylinder flow-in air flow rate mc(k−1) by applying to the above-mentioned Equation (8) the intake pipe section pressure Pm(k−1) and the intake pipe section temperature Tm(k−1) estimated at the (k−1)-th estimation time by means of the intake pipe model M6, and the intake air temperature Ta at the present point in time.

[Compressor Model M4]

The compressor model M4 estimates, on the basis of the intercooler section pressure Pic, the compressor rotational speed Ncm, etc., compressor flow-out air flow rate mcm, which is the flow rate of air flowing out of the compressor 91*a* (air supplied to the intercooler section), and compressor-imparting energy Ecm, which is an energy per unit time which the compressor 91*a* of the supercharger 91 imparts to air to be supplied to the intercooler section when the air passes through the compressor 91*a*.

First, the compressor flow-out air flow rate mcm estimated by the present model will be described. It is known that the compressor flow-out air flow rate mcm is empirically obtained on the basis of the compressor rotational speed Ncm and the value Pic/Pa obtained by dividing the intercooler section pressure Pic by the intake air pressure Pa. Accordingly, the compressor flow-out air flow rate mcm is obtained from the compressor rotational speed Ncm, the value Pic/Pa, and a table MAPMCM which is previously obtained through experiments and which defines the relationship between the compressor rotational speed Ncm and the value Pic/Pa, and the compressor flow-out air flow rate mcm.

Figure 9:
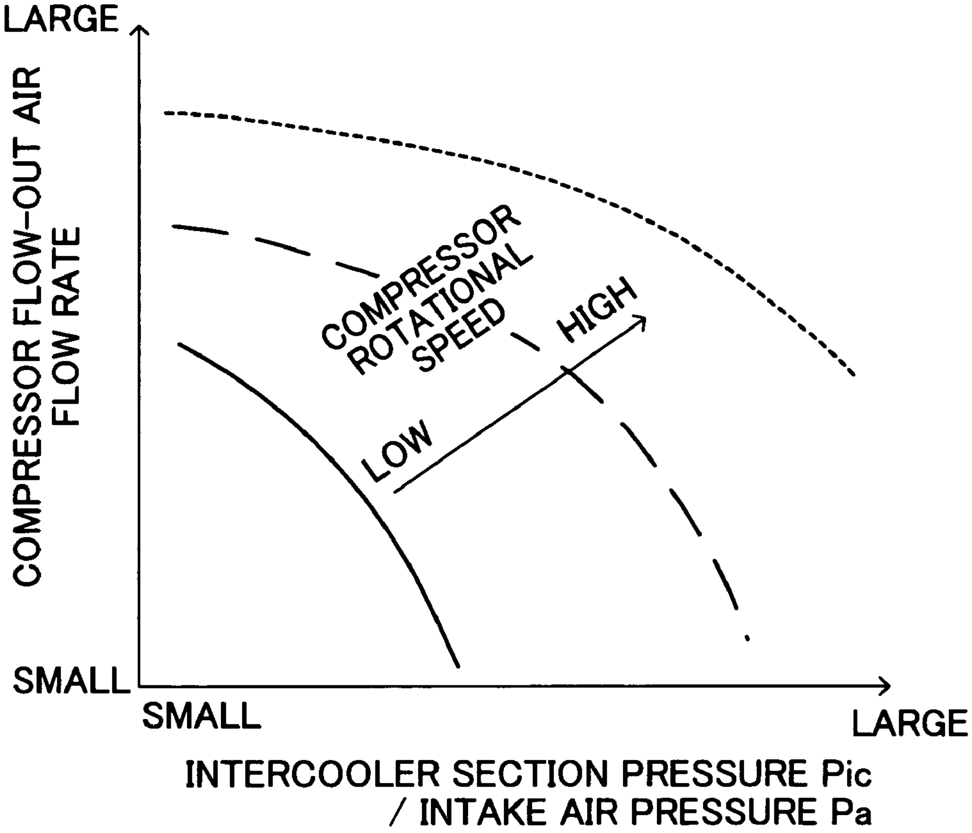
FIG. 9 is a graph showing the relation between a value obtained by dividing intercooler section pressure by intake air pressure and compressor flow-out air flow rate for various compressor rotational speeds, the relation being stored in the form of a table and being referenced by the CPU shown in FIG. 2.

The compressor model M4 stores in the ROM 72 the above-mentioned table MAPMCM as shown in FIG. 9. The compressor model M4 estimates the compressor flow-out air flow rate mcm(k−1) (=MAPMCM(Pic(k−1)/Pa, Ncm)) from the above-mentioned table MAPMCM, the compressor rotational speed Ncm at the present point in time detected by the compressor rotational speed sensor 63, and the value Pic(k−1)/Pa, which is obtained by diving, by the intake air pressure Pa at the present point in time, the intercooler section pressure Pic(k−1) estimated at the (k−1)-th estimation time by means of the intercooler model M5.

In stead of the above-described table MAPMCM, the compressor model M4 may store in the ROM 72 a table MAPMCMSTD which defines the relationship between value Picstd/Pstd obtained by dividing intercooler section pressure Picstd in a standard state by standard pressure Pstd, compressor rotational speed Ncmstd in the standard state, and compressor flow-out air flow rate mcmstd in the standard state. Here, the standard state is a state in which the pressure of compressor flow-in air, which is air flowing into the compressor 91*a,* is standard pressure Pstd (e.g., 96276 Pa), and the temperature of the compressor flow-in air is standard temperature Tstd (e.g., 303.02 K).

In this case, the compressor model M4 obtains the compressor flow-out air flow rate mcmstd in the standard state from the value Pic/Pa obtained by dividing the intercooler section pressure Pic by the intake air pressure Pa, the compressor rotational speed Ncmstd in the standard state, which is obtained by applying the compressor rotational speed Ncm to the right-hand side of Equation (9) described below, and the above-described table MAPMCMSTD. Subsequently, the compressor model M4 applies the obtained compressor flow-out air flow rate mcmstd in the standard state to the right-hand side of Equation (10) described below so as to obtain the compressor flow-out air flow rate mcm in a state in which the pressure of the compressor flow-in air is equal to the intake air pressure Pa and the temperature of the compressor flow-in air is equal to the intake air temperature Ta.

$$Ncmstd = Ncm\cdot\frac{1}{\sqrt{\dfrac{Ta}{Tstd}}} \tag{9}$$

$$mcm = mcmstd\cdot\frac{\dfrac{Pa}{Pstd}}{\sqrt{\dfrac{Ta}{Tstd}}} \tag{10}$$

Next, the compressor-imparting energy Ecm estimated by the present model will be described. The compressor-imparting energy Ecm is obtained by use of Equation (11) described below, which is a generalized mathematical formula representing a portion of the present model and is based on the energy conservation law, the compressor efficiency η, the compressor flow-out air flow rate mcm; the value Pic/Pa obtained by dividing the intercooler section pressure Pic by the intake air pressure Pa, and the intake air temperature Ta.

$$Emc = Cp\cdot mcm\cdot Ta\left(\left(\frac{Pic}{Pa}\right)^{\frac{\kappa-1}{\kappa}}-1\right)\frac{1}{\eta} \tag{11}$$

In Equation (11), Cp is specific heat at constant pressure. It is known that the compressor efficiency η is empirically estimated on the basis of the compressor flow-out air flow rate mcm and the compressor rotational speed Ncm. Accordingly, the compressor efficiency η is obtained from the compressor flow-out air flow rate mcm, the compressor rotational speed Ncm, and a table MAPETA which is predetermined through experiments and defines the relationship between the compressor flow-out air flow rate mcm and the compressor rotational speed Ncm, and the compressor efficiency η.

Figure 10:
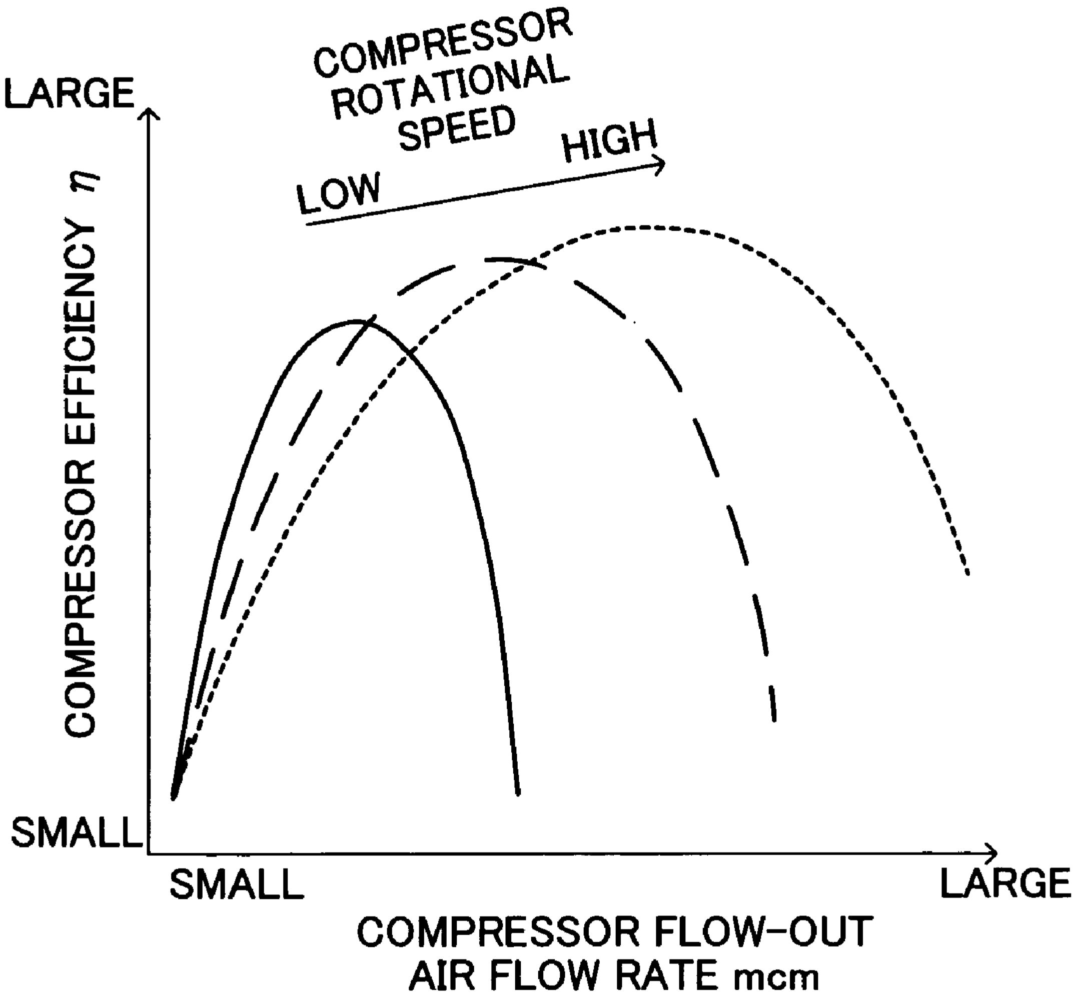
FIG. 10 is a graph showing the relation between compressor flow-out air flow rate and compressor efficiency for various compressor rotational speeds, the relation being stored in the form of a table and being referenced by the CPU shown in FIG. 2.

The compressor model M4 stores in the ROM 72 the above-mentioned table MAPETA as shown in FIG. 10. The compressor model M4 estimates the compressor efficiency η(k−1) (=MAPETA(mcm(k−1), Ncm)) from the above-mentioned table MAPETA, the estimated compressor flow-out air flow rate mcm(k−1), and the compressor rotational speed Ncm at the present point in time detected by the compressor rotational speed sensor 63.

Subsequently, the compressor model M4 estimates the compressor-imparting energy Ecm(k−1) by applying to the above-described Equation (11) the estimated compressor efficiency η(k−1), the estimated compressor flow-out air flow rate mcm(k−1), the value Pic(k−1)/Pa, which is obtained by diving, by the intake air pressure Pa at the present point in time, the intercooler section pressure Pic (k−1) estimated at the (k−1)-th estimation time by means of the intercooler model M5, and the intake air temperature Ta at the present point in time.

Here, there will be described a procedure of deriving the above-mentioned Equation (11), which represents a portion of the compressor model M4. In the following description, all the energy of air after entering the compressor 91*a* and until leaving the compressor 91*a* is assumed to contribute to temperature increase (i.e., kinetic energy is ignored).

Here, the flow rate of compressor flow-in air, which is air flowing into the compressor 91*a*, is represented by mi, the temperature of the compressor flow-in air is represented by Ti. Similarly, the flow rate of compressor flow-out air, which is air flowing out of the compressor 91*a*, is represented by mo, and the temperature of the compressor flow-out air is represented by To. In this case, the energy of the compressor flow-in air is represented by Cp·mi·Ti, and the energy of the compressor flow-out air is represented by Cp·mo·To. Since the sum of the energy of the compressor flow-in air and the compressor-imparting energy Ecm is equal to the energy of the compressor flow-out air, Equation (12) based on the energy conservation law is obtained as follows.

$$Cp \cdot mi \cdot Ti + Ecm = Cp \cdot mo \cdot To \tag{12}$$

Incidentally, since the flow rate mi of the compressor flow-in air is equal to the flow rate mo of the compressor flow-out air, the following Equation (13) can be obtained from Equation (12).

$$Ecm = Cp \cdot mo \cdot (To - Ti) \tag{13}$$

Meanwhile, the compressor efficiency η is defined by the following Equation (14).

$$\eta = \frac{Ti\left(\left(\frac{Po}{Pi}\right)^{\frac{\kappa-1}{\kappa}} - 1\right)}{To - Ti} \tag{14}$$

In Equation (14), Pi is the pressure of the compressor flow-in air, and Po is the pressure of the compressor flow-out air. The following Equation (15) is obtained by substituting Equation (14) into Equation (13).

$$Ecm = Cp \cdot mo \cdot Ti\left(\left(\frac{Po}{Pi}\right)^{\frac{\kappa-1}{\kappa}} - 1\right)\frac{1}{\eta} \tag{15}$$

The pressure Pi and temperature Ti of the compressor flow-in air can be considered to be equal to the intake air pressure Pa and the intake air temperature Ta, respectively. Further, since pressure propagates more quickly than temperature, the pressure Po of the compressor flow-out air can be considered to be equal to the intercooler section pressure Pic. Further, the flow rate mo of the compressor flow-out air is the compressor flow-out air flow rate mcm. When these are considered, the above-described Equation (11) is obtained from Equation (15).

[Intercooler Model M5]

The intercooler model M5 estimates the intercooler section pressure Pic and the intercooler section temperature Tic in accordance with the following Equations (16) and (17), which are generalized mathematical formulas representing the present model and are based on the mass conservation law and the energy conservation law for air within the intercooler section, and on the basis of the intake air temperature Ta, the flow rate of air flowing into the intercooler section (i.e., compressor flow-out air flow rate) mcm, the compressor-imparting energy Ecm, and the flow rate of air flowing out of the intercooler section (i.e., throttle-passing air flow rate) mt. Notably, Vic in Equations (16) and (17) represents the volume of the intercooler section.

$$d(Pic/Tic)/dt = (R/Vic) \cdot (mcm - mt) \tag{16}$$

$$dPic/dt = \kappa \cdot (R/Vic) \cdot (mcm \cdot Ta - mt \cdot Tic) + (\kappa - 1)/(Vic) \cdot (Ecm - K \cdot (Tic - Ta)) \tag{17}$$

The intercooler model M5 estimates latest intercooler section pressure Pic(k) and latest intercooler section temperature Tic(k) by use of the following Equations (18) and (19), obtained by discretizing the above Equations (16) and (17) by means of difference method, the compressor flow-out air flow rate mcm(k−1) and the compressor-imparting energy Ecm(k−1) obtained by the compressor model M4, the throttle-passing air flow rate mt(k−1) obtained by the throttle model M2, the intake air temperature Ta at the present point in time, and the intercooler section pressure Pic(k−1) and the intercooler section temperature Tic(k−1) estimated at the (k−1)-th estimation time by the present model. However, in the case where the estimation of the intercooler section pressure Pic and the intercooler section temperature Tic has not yet been performed (when the present model first performs the estimation (in the present example, at the time of start of operation of the internal combustion engine 10)), the intercooler model M5 employs the intake air pressure Pa and the intake air temperature Ta as the intercooler section pressure Pic(0) and the intercooler section temperature Tic (0), respectively.

$$(Pic/Tic)(k) = (Pic/Tic)(k-1) + \Delta t \cdot (R/Vic) \cdot (mcm(k-1) - mt(k-1)) \tag{18}$$

$$Pic(k) = Pic(k-1) + \Delta t \cdot \kappa \cdot (R/Vic) \cdot (mcm(k-1) \cdot Ta - mt(k-1) \cdot Tic(k-1)) + \Delta t \cdot (\kappa - 1)/(Vic) \cdot (Ecm(k-1) - K \cdot (Tic(k-1) - Ta)) \tag{19}$$

Here, there will be described a procedure of deriving the above-mentioned Equations (16) and (17), which represent the intercooler model M5. First, Equation (16), which is based on the mass conservation law for air within the intercooler section, will be considered. When the total amount of air within the intercooler section is represented by M, a change (time-course change) in the total air amount M per unit time is the difference between the compressor flow-out air flow rate mcm, which corresponds to the flow rate of air flowing into the intercooler section, and the throttle-passing air flow rate mt, which corresponds to the flow rate of air flowing out of the intercooler section. Therefore, the following Equation (20) based on the mass conservation law is obtained.

$$dM/dt=mcm-mt \tag{20}$$

Further, when the pressure and temperature of air within the intercooler section are assumed to be spatially uniform, the following Equation (21) based on the state equation is obtained. When Equation (21) is substituted into Equation (20) and the total air amount M is eliminated, the above-described Equation (16) based on the mass conservation law is obtained by taking into account the fact that the volume Vic of the intercooler section does not change.

$$Pic\cdot Vic=M\cdot R\cdot Tic \tag{21}$$

Next, Equation (17), which is based on the energy conservation law for air within the intercooler section, will be considered. A change per unit time (d(M·Cv·Tic)/dt) of the energy M·Cv·Tic (Cv: specific heat at constant volume) of air within the intercooler section is equal to the difference between the energy imparted to air within the intercooler section per unit time and the energy taken out of air within the intercooler section per unit time. In the following description, all the energy of air within the intercooler section is assumed to contribute to temperature increase (i.e., kinetic energy is ignored).

The energy imparted to air within the intercooler section is equal to the energy of air flowing into the intercooler section. This energy of air flowing into the intercooler section is equal to the sum of the energy Cp·mcm·Ta of air flowing into the intercooler section while being maintained at the intake air temperature Ta under the assumption that air is not compressed by the compressor 91*a* of the supercharger 91, and the compressor-imparting energy Ecm that the compressor 91*a* imparts to the air flowing into the intercooler section.

Meanwhile, the energy taken out of air within the intercooler section is equal to the sum of the energy Cp·mt·Tic of air flowing out of the intercooler section and heat exchange energy, which is the energy exchanged between air within the intercooler 45 and the wall of the intercooler 45.

From equations based on the general empirical rules, the heat exchange energy is obtained as a value K·(Tic−Ticw), which is proportional to the difference between the temperature Tic of air within the intercooler 45 and the temperature Ticw of the wall of the intercooler 45. Here, K is a value corresponding to the product of the surface area of the intercooler 45 and the heat transfer coefficient between air within the intercooler 45 and the wall of the intercooler 45. As described above, the intercooler 45 cools air within the intake passage by use of air outside the engine 10. Therefore, the temperature Ticw of the wall of the intercooler 45 is approximately equal to the temperature of air outside the engine 10. Accordingly, the temperature Ticw of the wall of the intercooler 45 can be considered to be equal to the intake air temperature Ta, and thus the above-mentioned heat exchange energy is obtained as a value K·(Tic−Ta).

According to the above, the following Equation (22), which is based on the energy conservation law for air within the intercooler section, is obtained.

$$d(M\cdot Cv\cdot Tic)/dt=Cp\cdot mcm\cdot Ta-Cp\cdot mt\cdot Tic+Ecm-K\cdot(Tic-Ta) \tag{22}$$

Incidentally, since the specific heat ratio κ is represented by the following Equation (23) and the Mayer relation is represented by the following Equation (24), the above-described Equation (17) is obtained by transforming Equation (22) by use of the above-mentioned Equation (21) (Pic·Vic=M·R·Tic), and the following Equations (23) and (24). Here, the transformation is performed by taking into account the fact that the volume Vic of the intercooler section does not change.

$$\kappa=Cp/Cv \tag{23}$$

$$Cp=Cv+R \tag{24}$$

[Intake Pipe Model M6)

The intake pipe model M6 estimates the intake pipe section pressure (throttle valve downstream pressure) Pm and the intake pipe section temperature (throttle valve downstream temperature) Tm in accordance with the following Equations (25) and (26), which are generalized mathematical formulas representing the present model and are based on the mass conservation law and the energy conservation law for air within the intake pipe section, and on the basis of the flow rate of air flowing into the intake pipe section (i.e., throttle-passing air flow rate) mt, the intercooler section temperature (i.e., throttle valve upstream temperature) Tic, and the flow rate of air flowing out of the intake pipe section (i.e., cylinder flow-in air flow rate) mc. Notably, Vm in Equations (25) and (26) represents the volume of the intake pipe section (the intake passage from the throttle valve 46 to the intake valve 32).

$$d(Pm/Tm)/dt=(R/Vm)\cdot(mt-mc) \tag{25}$$

$$dPm/dt=\kappa\cdot(R/Vm)\cdot(mt\cdot Tic-mc\cdot Tm) \tag{26}$$

The intake pipe model M6 estimates latest intake pipe section pressure Pm(k) and latest intake pipe section temperature Tm(k) by use of the following Equations (27) and (28), obtained by discretizing the above Equations (25) and (26) by means of difference method, the throttle-passing air flow rate mt(k−1) obtained by the throttle model M2, the cylinder flow-in air flow rate mc(k−1) obtained by the intake valve model M3, the intercooler section temperature Tic(k−1) estimated at the (k−1)-th estimation time by the intercooler model M5, and the intake pipe section pressure Pm(k−1) and the intake pipe section temperature Tm(k−1) estimated at the (k−1)-th estimation time by the present model. However, in the case where the estimation of the intake pipe section pressure Pm and the intake pipe section temperature Tm has not yet been performed (when the present model first performs the estimation (in the present example, at the time of start of operation of the internal combustion engine 10)), the intake pipe model M6 employs the intake air pressure Pa and the intake air temperature Ta as the intake pipe section pressure Pm(0) and the intake pipe section temperature Tm(0), respectively.

$$(Pm/Tm)(k)=(Pm/Tm)(k-1)+\Delta t(R/Vm)\cdot(mt(k-1)-mc(k-1)) \tag{27}$$

$$Pm(k)=Pm(k-1)+\Delta t\cdot\kappa\cdot(R/Vm)\cdot(mt(k-1)\cdot Tic(k-1)-mc(k-1)\cdot Tm(k-1)) \tag{28}$$

[Intake Valve Model M7]

The intake valve model M7 includes a model similar to the intake valve model M3. In the intake valve model M7, the latest intake pipe section pressure Pm(k) and intake pipe section temperature Tm(k) estimated at the k-th estimation time by the intake pipe model M6 and the intake air temperature Ta at the present point in time are applied to the above-described Equation (8); i.e., mc=(Ta/Tm)·(c·Pm·d), which is a generalized mathematical formula representing the present model and is based on the rule of thumb, whereby a latest cylinder flow-in air flow rate mc(k) is obtained. Subsequently, the intake valve model M7 obtains a predictive cylinder air quantity KLfwd, which is a cylinder air quantity estimated by multiplying the obtained cylinder flow-in air flow rate mc(k) by a time (intake valve open time) Tint, which is a period of time from the point in time when the intake valve 32 opens to the point in time when the intake valve 32 closes. The time Tint is calculated from the engine rotational speed NE at the present point in time and the open-close timing VT of the intake valve 32 at the present point in time.

As described above, when the throttle valve opening is smaller than the threshold throttle valve opening, the present air quantity estimation apparatus estimates the intercooler section pressure Pic, intercooler section temperature Tic, intake pipe section pressure Pm, and intake pipe section temperature Tm at a future point in time after the present point in time on the basis of the intercooler model M5, which is constructed on the basis of the conservation laws for air within the intercooler section, and the intake pipe model M6, which is constructed on the basis of the conservation laws for air within the intake pipe section. The air quantity estimation apparatus then estimates the predictive cylinder air quantity KLfwd on the basis of the estimated intercooler section pressure Pic, intercooler section temperature Tic, intake pipe section pressure Pm, and intake pipe section temperature Tm.

Next, the case where the throttle valve opening is greater than the threshold throttle valve opening will be described. In this case, as described above, the present air quantity estimation apparatus estimates the cylinder air quantity by use of the electronic-control throttle valve model M1, the intake valve model M3, the compressor model M4, the intake valve model M7, the IC-intake pipe combined model (combined section model) M8, and the electronic-control throttle valve logic A1 shown in FIG. 5.

Moreover, as described above, the models and logic shown in FIG. 5 differ from those shown in FIG. 4 in that the IC-intake pipe combined model M8 is provided in place of the throttle model M2, the intercooler model M5, and the intake pipe model M6. Accordingly, the IC-intake pipe combined model M8 will be described specifically.

[IC-Intake Pipe Combined Model M8]

The IC-intake pipe combined model M8 estimates combined section pressure Picm, which is the pressure of air within the combined section, and combined section temperature Ticm, which is the temperature of air within the combined section, in accordance with the following Equations (29) and (30), which are generalized mathematical formulas representing the present model and are based on the mass conservation law and the energy conservation law for air within the combined section, and on the basis of the intake air temperature Ta, the flow rate of air flowing into the combined section (i.e., compressor flow-out air flow rate) mcm, the compressor-imparting energy Ecm, and the flow rate of air flowing out of the combined section (i.e., cylinder flow-in air flow rate) mc. Notably, Vicm in Equations (29) and (30) represents the volume of the combined section.

$$d(Picm/Ticm)/dt=(R/Vicm)\cdot(mcm\cdot mc) \tag{29}$$

$$dPicm/dt=\kappa\cdot(R/Vicm)\cdot(mcm\cdot Ta-mc\cdot Ticm)+(\kappa-1)/(Vicm)\cdot(Ecm-K\cdot(Ticm-Ta)) \tag{30}$$

The IC-intake pipe combined model M8 estimates latest combined section pressure Picm(k) and latest combined section temperature Ticm(k) by use of the following Equations (31) and (32), obtained by discretizing the above Equations (29) and (30) by means of difference method, the compressor flow-out air flow rate mcm(k−1) and the compressor-imparting energy Ecm(k−1) obtained by the compressor model M4, the cylinder flow-in air flow rate mc(k−1) obtained by the intake valve model M3, the intake air temperature Ta at the present point in time, and the combined section pressure Picm(k−1) and combined section temperature Ticm(k−1) estimated at the (k−1)-th estimation time by the present model.

$$(Picm/Ticm)(k)=(Picm/Ticm)(k-1)+\Delta t\cdot(R/Vicm)\cdot(mcm(k-1)-mc(k-1)) \tag{31}$$

$$\begin{aligned}Picm(k)=Picm(k-1)&+\Delta t\cdot\kappa\cdot(R/Vicm)\cdot(mcm(k-1)\cdot Ta-mc(k-1)\cdot Ticm(k-1))\\&+\Delta t\cdot(\kappa-1)/(Vicm)\cdot(Ecm(k-1)-K\cdot(Ticm(k-1)-Ta))\end{aligned} \tag{32}$$

However, in the case where the estimation of the combined section pressure Picm and the combined section temperature Ticm, or the estimation of the intercooler section pressure Pic, the intercooler section temperature Tic, the intake pipe section pressure Pm, and the intake pipe section temperature Tm has not yet been performed (when the present model first performs the estimation (in the present example, at the time of start of operation of the internal combustion engine 10)), the IC-intake pipe combined model M8 employs the intake air pressure Pa and the intake air temperature Ta as the combined section pressure Picm(0) and the combined section temperature Ticm (0), respectively.

When the throttle valve opening, which has been smaller than the threshold throttle valve opening, becomes greater than the threshold throttle valve opening, the estimation of the combined section pressure Picm(k−1) and the combined section temperature Ticm(k−1) in accordance with the above-described Equations (31) and (32) is not performed at the (k−1)-th estimation time. Therefore, the combined section pressure Picm(k−1) and the combined section temperature Ticm(k−1) must be estimated on the basis of the intercooler section pressure Pic(k−1), the intercooler section temperature Tic(k−1), the intake pipe section pressure Pm(k−1), and the intake pipe section temperature Tm(k−1) at the (k−1) estimation time.

When the (k−1)-th estimation is performed by the throttle model M2, the intercooler model M5, and the intake pipe model M6, the IC-intake pipe combined model M8 estimates the combined section pressure Picm(k−1) and the combined section temperature Ticm(k−1) in accordance with the following Equations (33) and (34), respectively, and on the basis of the intercooler section pressure Pic(k−1), the intercooler section temperature Tic(k−1), the intake pipe section pressure Pm(k−1), and the intake pipe section temperature Tm(k−1).

$$Picm(k-1)=(Pic(k-1)\cdot Vic+Pm(k-1)\cdot Vm)/Vicm \quad (33)$$

$$Ticm(k-1)=(Pic(k-1)\cdot Vic+Pm(k-1)Vm)/(Pic(k-1)\cdot Vic/Tic(k-1)+Pm(k-1)\cdot Vm/Tm(k-1)) \quad (34)$$

Incidentally, the intake valve model M3, the compressor model M4, and the intake valve model M7 are used in the same manner as in the case where the throttle valve opening is smaller than the threshold throttle valve opening. As described above, these models obtain respective values by use of the intercooler section pressure Pic, the intercooler section temperature Tic, the intake pipe section pressure Pm, and the intake pipe section temperature Tm. Therefore, the IC-intake pipe combined model M8 needs to obtain the intercooler section pressure Pic, the intercooler section temperature Tic, the intake pipe section pressure Pm, and the intake pipe section temperature Tm on the basis of the estimated combined section pressure Picm and combined section temperature Ticm.

For such necessity, the IC-intake pipe combined model M8 stores the estimated combined section pressure Picm as the intercooler section pressure Pic and the intake pipe section pressure Pm, and stores the estimated combined section temperature Ticm as the intercooler section temperature Tic and the intake pipe section temperature Tm. That is, the IC-intake pipe combined model M8 estimates the combined section pressure Picm as the intercooler section pressure Pic and the intake pipe section pressure Pm, and estimates the combined section temperature Ticm as the intercooler section temperature Tic and the intake pipe section temperature Tm.

Here, there will be described a procedure of deriving the above-mentioned Equations (29) and (30), which represent the IC-intake pipe combined model M8. First, Equation (29), which is based on the mass conservation law for air within the combined section, will be considered. When the total amount of air within the combined section is represented by M, a change (time-course change) in the total air amount M per unit time is the difference between the compressor flow-out air flow rate mcm, which corresponds to the flow rate of air flowing into the combined section, and the cylinder flow-in air flow rate mc, which corresponds to the flow rate of air flowing out of the combined section. Therefore, the following Equation (35) based on the mass conservation law is obtained.

$$dM/dt=mcm-mc \quad (35)$$

Further, when the pressure and temperature of air within the combined section are assumed to be spatially uniform, the following Equation (36) based on the state equation is obtained. When Equation (36) is substituted into Equation (35) and the total air amount M is eliminated, the above-described Equation (29) based on the mass conservation law is obtained by taking into account the fact that the volume Vicm of the combined section does not change.

$$Picm\cdot Vicm=M\cdot R\cdot Ticm \quad (36)$$

Next, Equation (30), which is based on the energy conservation law for air within the combined section, will be considered. A change per unit time (d(M·Cv·Ticm)/dt) of the energy M·Cv·Ticm of air within the combined section is equal to the difference between the energy imparted to air within the combined section per unit time and the energy taken out of air within the combined section per unit time. In the following description, all the energy of air within the combined section is assumed to contribute to temperature increase (i.e., kinetic energy is ignored).

The energy imparted to air within the combined section is equal to the energy of air flowing into the combined section. This energy of air flowing into the combined section is equal to the sum of the energy Cp·mcm·Ta of air flowing into the combined section while being maintained at the intake air temperature Ta under the assumption that air is not compressed by the compressor 91*a* of the supercharger 91, and the compressor-imparting energy Ecm, which the compressor 91*a* imparts to the air flowing into the combined section.

Meanwhile, the energy taken out of air within the combined section is equal to the sum of the energy Cp·mt·Ticm of air flowing out of the combined section and heat exchange energy, which is the energy exchanged between air within the intercooler 45 and the wall of the intercooler 45.

Similar to the heat exchange energy obtained in the intercooler model M5, the heat exchange energy is obtained as a value K·(Ticm·Ta).

According to the above, the following Equation (37), which is based on the energy conservation law for air within the combined section, is obtained.

$$d(M\cdot Cv\cdot Ticm)/dt=Cp\cdot mcm\cdot Ta-Cp\cdot mc\cdot Ticm+Ecm-K\cdot(Ticm-Ta) \quad (37)$$

Incidentally, since the specific heat ratio κ is represented by the above-described Equation (23) and the Mayer relation is represented by the above-described Equation (24), the above-described Equation (30) is obtained by transforming Equation (37) by use of the above-mentioned Equation (36) (Picm·Vicm=M·R·Ticm) and the above-described Equations (23) and (24). Here, the transformation is performed by taking into account the fact that the volume Vicm of the combined section does not change.

Next, there will be described a procedure of deriving the above-described Equations (33) and (34), which represent relations for respectively estimating, on the basis of values of the intercooler section pressure Pic, the intercooler section temperature Tic, the intake pipe section pressure Pm, and the intake pipe section temperature Tm at a certain point in time, the combined section pressure Picm and combined section temperature Ticm at that point in time. First, Equation (33), which represents a relation for estimating the combined section pressure Picm will be considered. Here, the total amount of air within the combined section is represented by Micm, the total amount of air within the intercooler section is represented by Mic, and the total amount of air within the intake pipe section is represented by Mm. In this case, the energy Micm·Cv·Ticm of air within the combined section can be represented as the sum of the energy Mic·Cv·Tic of air within the intercooler section and the energy Mm·Cv·Tm of air within the intake pipe section, and therefore, the following Equation (38) is obtained.

$$Micm\cdot Cv\cdot Ticm=Mic\cdot Cv\cdot Tic+Mm\cdot Cv\cdot Tm \quad (38)$$

Further, the state equation of air within the combined section, the state equation of air within the intercooler section, and the state equation of air within the intake pipe section are represented by the following Equations (39), (40), and (41), respectively. When these state equations are substituted into the above-described Equation (38) such that Micm, Mic, and Mm are eliminated and a resultant equation is solved for the combined section pressure Picm, the above-described Equation (33) can be obtained.

$$Picm \cdot Vicm = Micm \cdot R \cdot Ticm \tag{39}$$

$$Pic \cdot Vic = Mic \cdot R \cdot Tic \tag{40}$$

$$Pm \cdot Vm = Mm \cdot R \cdot Tm \tag{41}$$

Next, the above-described Equation (34), which represents a relation for estimating the combined section temperature Ticm, will be considered. Since the mass (total amount) Micm of air within the combined section can be represented as the sum of the mass Mic of air within the intercooler section and the mass Mm of air within the intake pipe section, the following Equation (42) is obtained.

$$Micm = Mic + Mm \tag{42}$$

The above-described Equations (39), (40), and (41) are substituted into the above-described Equation (42) such that Micm, Mic, and Mm are eliminated, and the above-described Equation (33) is substituted thereinto so as to eliminate the combined section pressure Picm. Subsequently, a resultant equation is solved for the combined section pressure Ticm. As a result, the above-described Equation (34) can be obtained.

As described above, when the throttle valve opening is greater than the threshold throttle valve opening, the present air quantity estimation apparatus estimates, as the intercooler section pressure Pic and the intake pipe section pressure Pm, the combined section pressure Picm at a future point in time after the present point in time on the basis of the IC-intake pipe combined model M8, which is constructed on the basis of the conservation laws for air within the combined section. The present air quantity estimation apparatus also estimates, as the intercooler section temperature Tic and the intake pipe section temperature Tm, the combined section temperature Ticm at the future point in time on the basis of the IC-intake pipe combined model M8. The air quantity estimation apparatus then estimates the predictive cylinder air quantity KLfwd on the basis of the estimated intercooler section pressure Pic, intercooler section temperature Tic, intake pipe section pressure Pm, and intake pipe section temperature Tm.

Next, actual operation of the electric control apparatus 70 will be described with reference to FIGS. 11 to 17.

[Estimation of Throttle Valve Opening]

Figure 11:
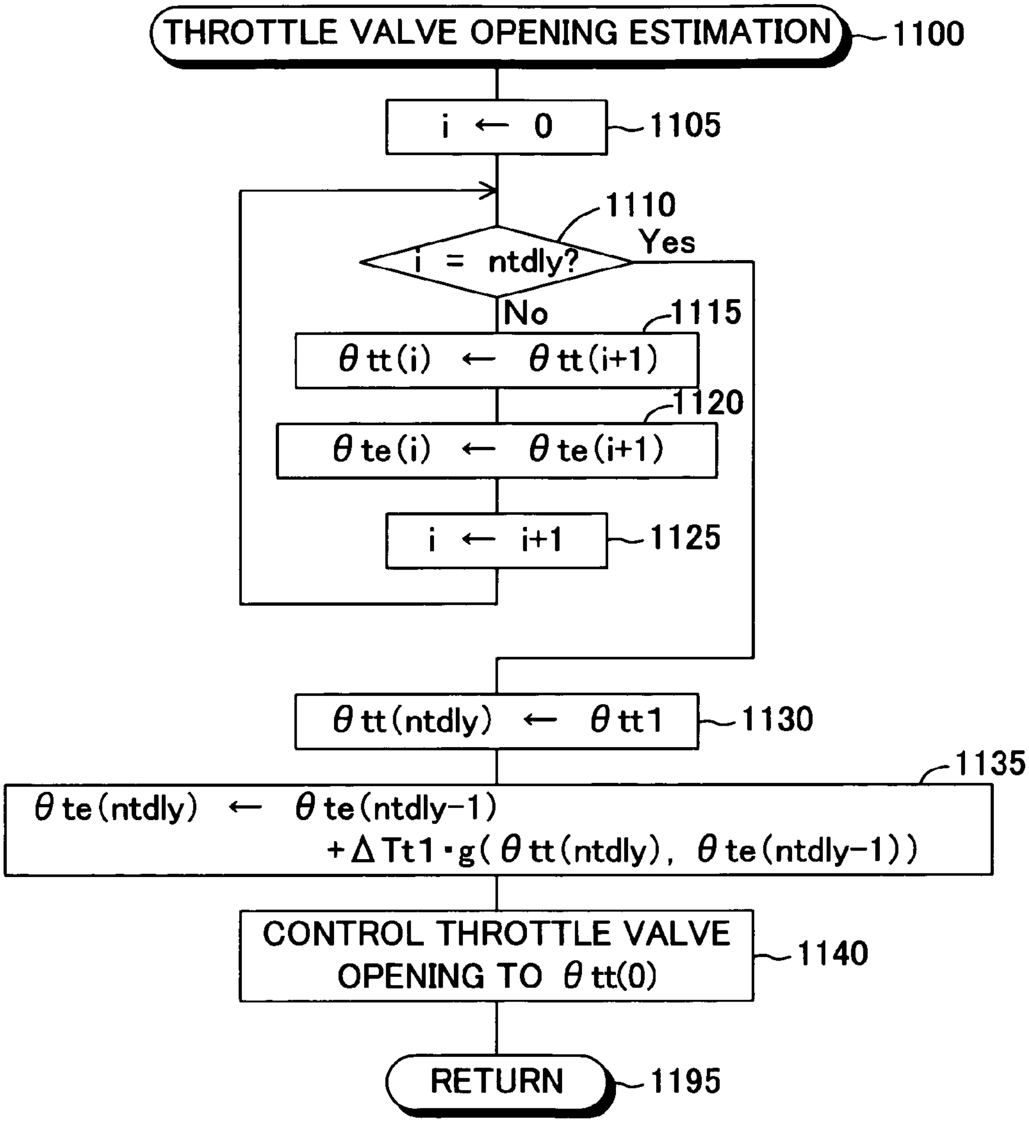
FIG. 11 is a flowchart showing a program that the CPU shown in FIG. 2 executes so as to estimate the throttle valve opening.

The CPU 71 accomplishes the functions of the electronic-control throttle valve model M1 and the electronic-control throttle valve logic A1 by executing a throttle valve opening estimation routine, shown by a flowchart in FIG. 11, every time a predetermined computation interval ΔTt1 (in the present example, 2 ms) elapses. Notably, executing the throttle valve opening estimation routine corresponds to accomplishing the function of the throttle valve opening estimation means.

Specifically, the CPU 71 starts the processing from Step 1100 at a predetermined timing, proceeds to Step 1105 so as to set a variable i to zero, and then proceeds to Step 1110 so as to determine whether the variable i is equal to a delay cycle number ntdly. This delay cycle number ntdly is a value (in the present example, 32) which is obtained by dividing the delay time TD (in the present example, 64 ms) by the above-described computation interval ΔTt1.

Since the variable i is zero at the present point in time, the CPU 71 determines that the answer in Step 1110 is "No", and proceeds to Step 1115 so as to store the value of a target throttle valve opening θtt(i+1) in a memory location for a target throttle valve opening θtt(i). In Step 1120 subsequent thereto, the CPU 71 stores the value of a predictive throttle valve opening θte(i+1) in a memory location for a predictive throttle valve opening θte(i). Through the above-described processing, the value of the target throttle valve opening θtt(1) is stored in the memory location for the target throttle valve opening θtt(0), and the value of the predictive throttle valve opening θte(1) is stored in the memory location for the predictive throttle valve opening θte(0).

Next, after incrementing the value of the variable i by one in Step 1125, the CPU 71 returns to Step 1110. When the value of the variable i is smaller than the delay cycle number ntdly, the CPU 71 again executes Steps 1115 to 1125. That is, Steps 1115 to 1125 are repeatedly executed until the value of the variable i becomes equal to the delay cycle number ntdly. Thus, the value of the target throttle valve opening θtt(i+1) is successively shifted to the memory location for the target throttle valve opening θtt(i), and the value of the predictive throttle valve opening θte(i+1) is successively shifted to the memory location for the predictive throttle valve opening θte(i).

When the value of variable i becomes equal to the delay cycle number ntdly as a result of repetition of the above-described Step 1125, the CPU 71 determines that the answer in Step 1110 is "Yes", and proceeds to Step 1130 in order to obtain a provisional target throttle valve opening θtt1 for the present point in time on the basis of the accelerator pedal operation amount Accp at the present point in time and the table shown in FIG. 6, and stores it in a memory location for a target throttle valve opening θtt(ntdly) so as to enable it to be used as a target throttle valve opening θtt after elapse of the delay time TD.

Next, the CPU 71 proceeds to Step 1135 and calculates a predictive throttle valve opening θte(ntdly) after elapse of the delay time TD from the present point in time on the basis of a predictive throttle valve opening θte(ntdly−1), the target throttle valve opening θtt(ntdly), and an equation shown in the box of Step 1135, which is based on the above-described Equation (4) (the right-hand side thereof). The predictive throttle valve opening θte(ntdly−1) was stored at the previous time of computation as a predictive throttle valve opening θte after elapse of the delay time TD from the previous time of computation. The target throttle valve opening θtt(ntdly) was stored in Step 1130 as the target throttle valve opening θtt after elapse of the delay time TD. Subsequently, in Step 1140, the CPU 71 sends a drive signal to the throttle valve actuator 46*a* such that the actual throttle valve opening θta coincides with the target throttle valve opening θtt(0). After that, the CPU 71 proceeds to Step 1195 so as to end the current execution of the present routine.

As described above, in a memory (RAM 73) for the target throttle valve opening θtt, each of the values of the target throttle valve opening θtt stored in the memory is shifted, one at a time, every time the present routine is executed, and the value stored in the memory location for the target throttle valve opening θtt(0) is used as the target throttle valve opening θtt that is output to the throttle valve actuator 46*a* by the electronic-control throttle valve logic A1. That is, the value stored in the memory location for the target throttle valve opening θtt(ntdly) at the current execution of the present routine is stored in the memory location for the target throttle valve opening θtt(0) when the execution of the present routine is repeated the delay cycle number ntdly times (after the delay time TD). Further, in a memory for the predictive throttle valve opening θte, a predictive throttle valve opening θte after elapse of a predetermined time (m·ΔTt) after the present point in time is stored in the memory location for θte(m). The value m in this case is an integer between 0 and the ntdly.

[Estimation of Cylinder Air Quantity]

Figure 12:
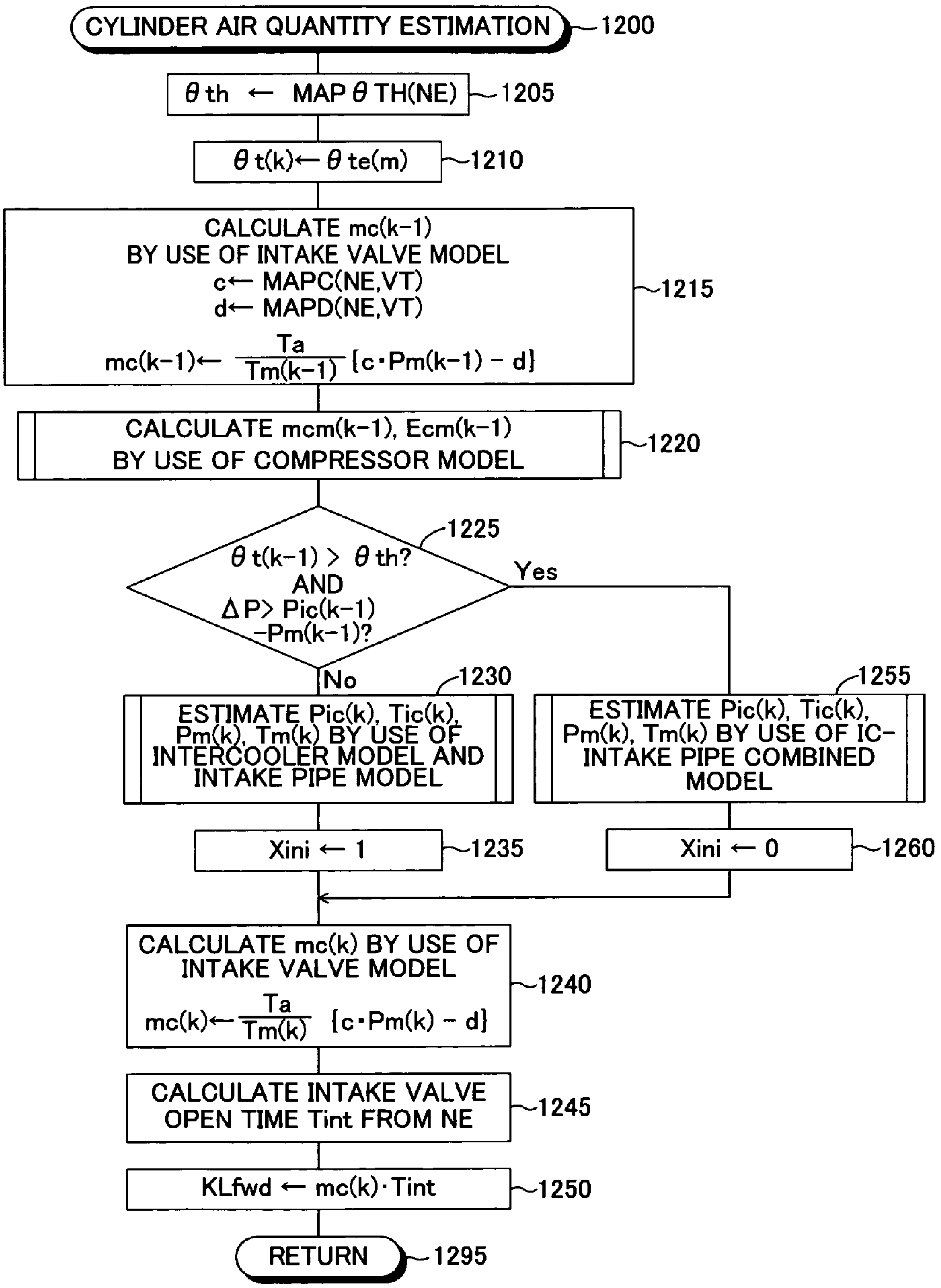
FIG. 12 is a flowchart showing a program that the CPU shown in FIG. 2 executes so as to estimate the cylinder air quantity.

Meanwhile, the CPU 71 estimates the cylinder air quantity at a future point in time after the present point in time by executing a cylinder air quantity estimation routine, shown by a flowchart in FIG. 12, every time a predetermined computation interval ΔTt2 (in the present example, 8 ms) elapses. Specifically, at a predetermined timing, the CPU 71 starts the processing from Step 1200, and proceeds to Step 1205 so as to obtain a threshold throttle valve opening θth from a table MAPθTH and the engine rotational speed NE at the present point in time. The table MAPθTH is set such that the threshold throttle valve opening θth is not less than, for example, 30 degrees and increases with the engine rotational speed NE.

Next, the CPU 71 proceeds to Step 1210. In Step 1210, from θte(m) (m is an integer between 0 and ntdly) stored in the memory by means of the throttle valve opening estimation routine of FIG. 11, the CPU 71 reads in, as a predictive throttle valve opening θt(k), the predictive throttle valve opening θte(m) estimated as a throttle valve opening at a point in time closest to a point in time after a predetermined time interval Δt0 from the present point in time. In the present example, the time interval Δt0 is a period of time between a predetermined point in time before the fuel injection start point in time of a certain cylinder (a point in time before which the quantity of fuel to be injected must be determined) and a point in time of closure of the intake valve 32 in the intake stroke of the cylinder (intake stroke end time). Here, k is an integer whose value is incremented by one every time the present routine is executed, and represents the number of times the present routine has been executed.

Figure 13:
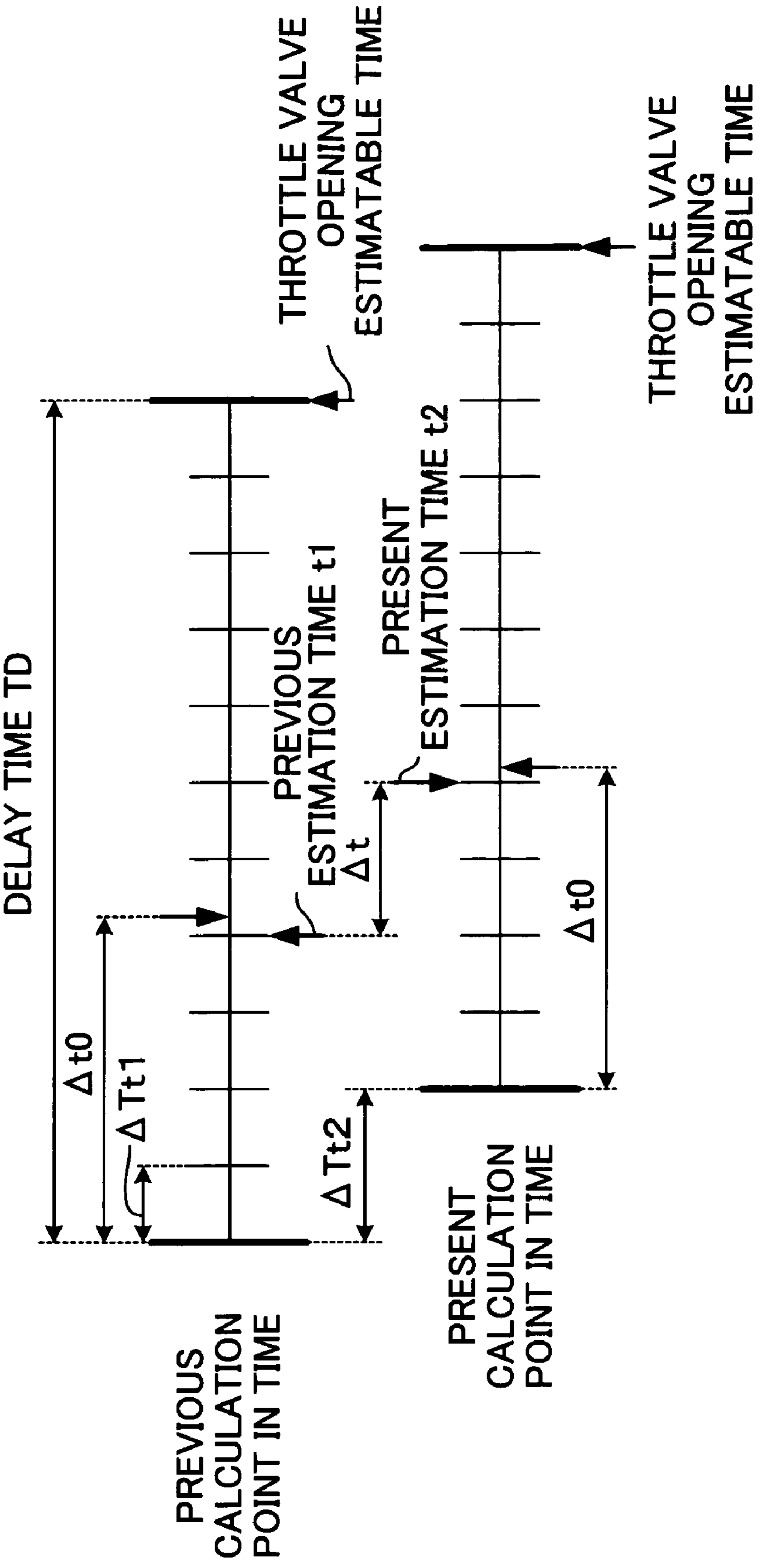
FIG. 13 is a schematic diagram showing the relation among throttle valve opening estimatable point, predetermined time interval Δt0, previous estimation time t1, and present estimation time t2.

In the following description, in order to simplify the description, a point in time corresponding to the predictive throttle valve opening θt(k−1) read in in Step 1210 at the previous time of computation (at the time of (k−1)-th execution of the present routine) will be referred to as the "previous estimation time t1," and a point in time corresponding to the predictive throttle valve opening θt(k) read in in Step 1210 at the preset time of computation (at the time of k-th execution of the present routine) will be referred to as the "present estimation time t2" (see FIG. 13, which is a schematic diagram showing the relation among the throttle valve opening estimatable time (point in time), the predetermined time interval Δt0, the previous estimation time t1, and the present estimation time t2).

Subsequently, the CPU 71 proceeds to Step 1215 so as to obtain the coefficient c of Equation (8) representing the intake valve model M3 from the above-described table MAPC, the engine rotational speed NE at the present point in time, and the open-close timing VT of the intake valve 32 at the present point in time. Similarly, the CPU 71 obtains the value d from the above-described table MAPD, the engine rotational speed NE at the present point in time, and the open-close timing VT of the intake valve 32 at the present point in time. Subsequently, in Step 1215, the CPU 71 obtains the cylinder flow-in air flow rate mc(k−1) at the previous estimation time t1 in accordance with the equation, shown in the box of Step 1215 and based on Equation (8) representing the intake valve model M3, the intake pipe section pressure Pm(k−1) and intake pipe section temperature Tm(k−1) at the previous estimation time t1 obtained in Step 1230 or Step 1255 (which will be described later) at the time of previous execution of the present routine, and the intake air temperature Ta at the present point in time.

Figure 14:
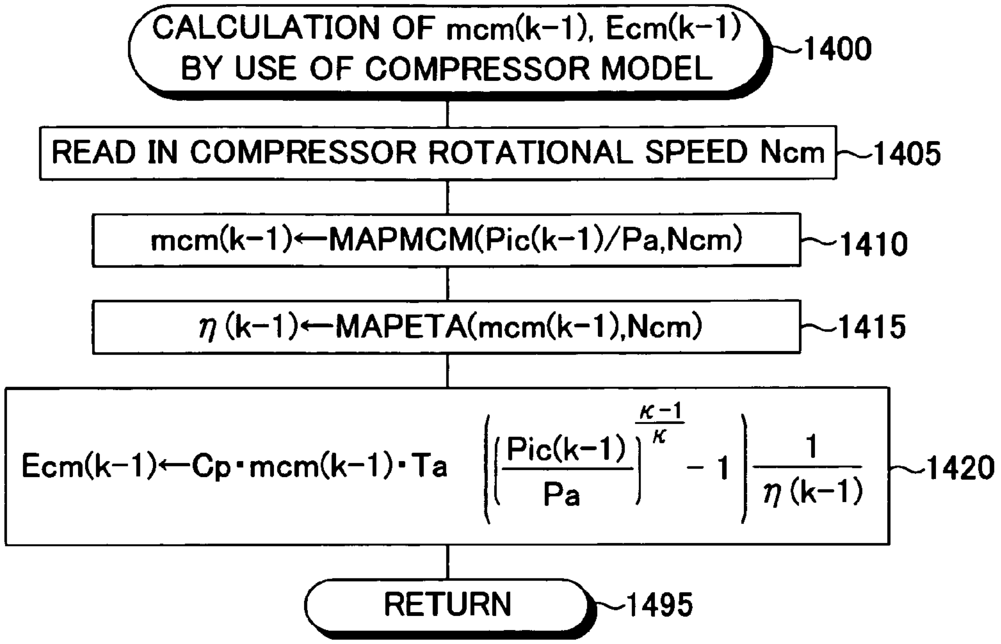
FIG. 14 is a flowchart showing a program that the CPU shown in FIG. 2 executes so as to estimate the compressor flow-out air flow rate and compressor-imparting energy.

Next, the CPU 71 proceeds to Step 1220 and then proceeds to Step 1400 of a flowchart of FIG. 14 so as to obtain the compressor flow-out air flow rate mcm(k−1) and the compressor-imparting energy Ecm(k−1) by use of the compressor model M4.

Next, the CPU 71 proceeds to Step 1405 so as to read in the compressor rotational speed Ncm detected by the compressor rotational speed sensor 63. The CPU 71 then proceeds to Step 1410 so as to obtain the compressor flow-out air flow rate mcm(k−1) at the previous estimation time t1 from the above-described table MAPMCM, the value Pic (k−1)/Pa, which is a value obtained by dividing, by the intake air pressure Pa at the present point in time, the intercooler section pressure Pic(k−1) at the previous estimation time t1 obtained in Step 1230 or Step 1255 (which will be described later) at the time of previous execution of the routine of FIG. 12, and the compressor rotational speed Ncm read in in the above-described Step 1405.

The CPU 71 then proceeds to Step 1415 so as to obtain the compressor efficiency η(k−1) from the above-described table MAPETA, the compressor flow-out air flow rate mcm (k−1) obtained in the above-described Step 1410, and the compressor rotational speed Ncm read in in the above-described Step 1405.

Subsequently, the CPU 71 then proceeds to Step 1420 so as to obtain the compressor-imparting energy Ecm(k−1) at the previous estimation time t1 in accordance with the equation, shown in the box of Step 1420 and based on Equation (11) representing a portion of the compressor model M4, the value Pic(k−1)/Pa, which is a value obtained by dividing, by the intake air pressure Pa at the present point in time, the intercooler section pressure Pic(k−1) at the previous estimation time t1 obtained in Step 1230 or Step 1255 (which will be described later) at the time of previous execution of the routine of FIG. 12, the compressor flow-out air flow rate mcm(k−1) obtained in the above-described Step 1410, the compressor efficiency η(k−1) obtained in the above-described Step 1415, and the intake air temperature Ta at the present point in time. The CPU 71 then proceeds to Step 1225 of FIG. 12 via Step 1495.

In Step 1225, the CPU 71 determines whether the following two selection conditions are satisfied: (1) a throttle valve opening condition; i.e., the predictive throttle valve opening θt(k−1) read in in Step 1210 at the time of previous execution of the present routine being greater than the threshold throttle valve opening θth obtained in the above-described Step 1205; and (2) a pressure difference condition; i.e., the difference between the intercooler section pressure Pic(k−1) and the intake pipe section pressure Pm(k−1) at the previous estimation time t1 obtained in Step 1230 or Step 1255 (which will be described later) at the time of previous execution of the present routine being smaller than a predetermined value ΔP (in the present example, 1/100 of the intercooler section pressure Pic(k−1)). Notably, executing the processing of Step 1225 corresponds to accomplishing the function of the selection condition determination means.

Here, there will be considered a case where the throttle valve opening is smaller than 30 degrees and the engine 10 is being operated in the state (steady state) in which the accelerator pedal operation amount Accp does not change. In this case, since the predictive throttle valve opening θt(k−1) is smaller than the threshold throttle valve opening θth, the CPU 71 determines that the answer in Step 1225 is "No", and then proceeds to Step 1230. In Step 1230, the CPU 71 proceeds to Step 1500 of a flowchart of FIG. 15 so as to estimate the intercooler section pressure Pic(k), intercooler section temperature Tic(k), intake pipe section pressure Pm(k), and intake pipe section temperature Tm(k) at the present estimation time t2 by use of the throttle model M2, the intercooler model M5, and the intake pipe model M6. Notably, executing the routine of FIG. 15 corresponds to accomplishing the function of the first pressure estimation means.

Figure 16:
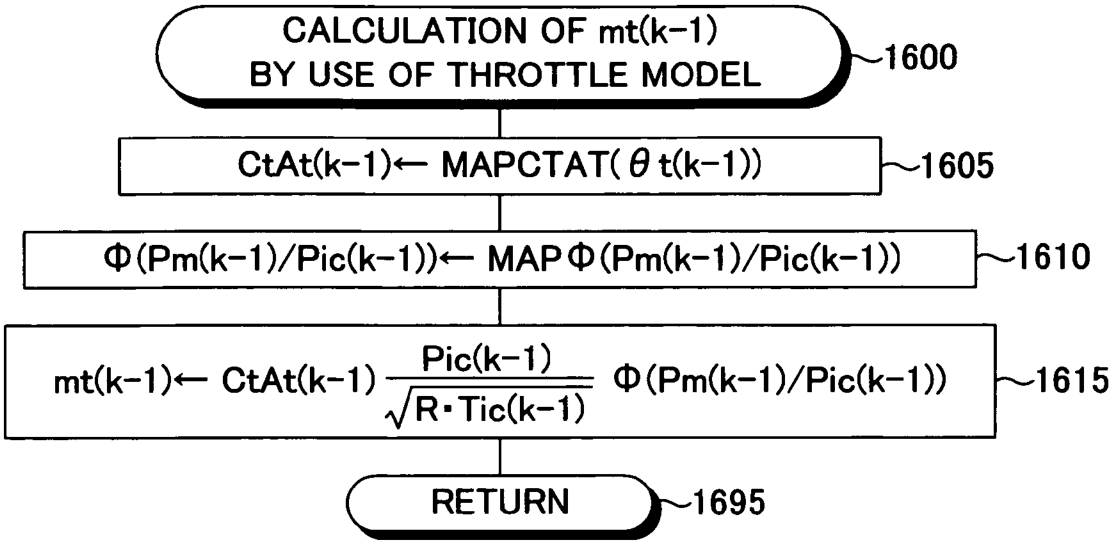
FIG. 16 is a flowchart showing a program that the CPU shown in FIG. 2 executes so as to estimate the throttle-passing air flow rate.

Subsequently, the CPU 71 proceeds to Step 1505, and then proceeds to Step 1600 of a flowchart of FIG. 16 so as to estimate the throttle-passing air flow rate mt(k−1) by use of the throttle model M2. Notably, executing the routine of FIG. 16 corresponds to accomplishing the function of the throttle-passing air flow rate estimation means.

The CPU 71 then proceeds to Step 1605 so as to obtain the value Ct(θt)·At(θt) of the above-described Equation (5) from the above-described table MAPCTAT and the predictive throttle valve opening θt(k−1) read in in Step 1210 at the time of previous execution of the routine of FIG. 12.

Subsequently, the CPU 71 proceeds to Step 1610 so as to obtain the value Φ(Pm(k−1)/Pic(k−1)) from the above-described table MAPΦ and the value Pm(k−1)/Pic(k−1), which is a value obtained by dividing the intake pipe section pressure Pm(k−1) at the previous estimation time t1 obtained in Step 1515 (which will be described later) at the time of previous execution of the routine of FIG. 15 by the intercooler section pressure Pic(k−1) at the previous estimation time t1 obtained in Step 1510 (which will be described later) at the time of previous execution of the routine of FIG. 15.

Figure 15:
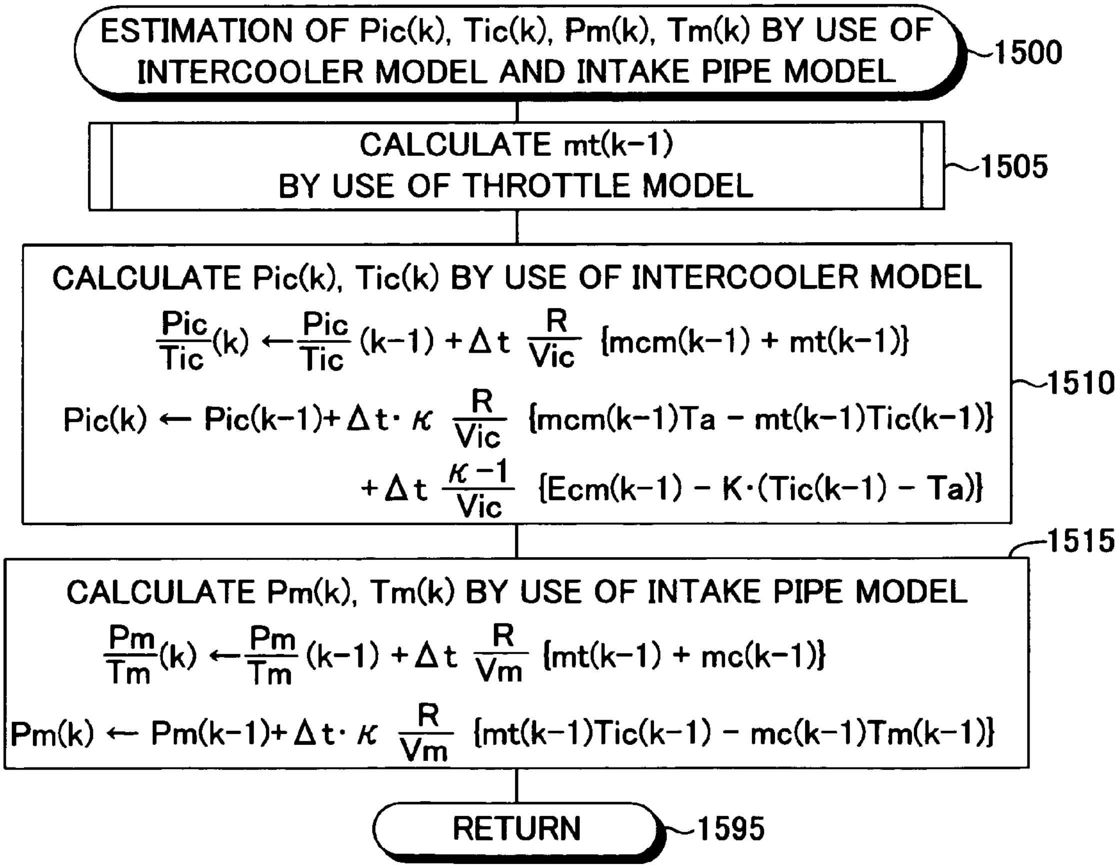
FIG. 15 is a flowchart showing a program that the CPU shown in FIG. 2 executes so as to estimate the intercooler section pressure, intercooler section temperature, intake pipe section pressure, and intake pipe section temperature by use of an intercooler model and an intake pipe model.

The CPU 71 then proceeds to Step 1615 so as to obtain the throttle-passing air flow rate mt(k−1) at the previous estimation time t1 in accordance with the equation, shown in the box of Step 1615 and based on Equation (5) representing the throttle model M2, the values obtained in the above-described Steps 1605 and 1610, respectively, and the intercooler section pressure Pic(k−1) and the intercooler section temperature Tic(k−1) at the previous estimation time t1 obtained in Step 1510 (which will be described later) at the time of previous execution of the routine of FIG. 15. The CPU 71 then proceeds to Step 1510 of FIG. 15 via Sep 1695.

In Step 1510, the CPU 71 obtains the intercooler section pressure Pic(k) at the present estimation time t2 and the value {Pic/Tic}(k), which is a value dividing the intercooler section pressure Pic(k) by the intercooler section temperature Tic(k) at the present estimation time t2, in accordance with Equations (18) and (19) (equations (differential equations) shown in the box of Step 1510), which are obtained by discretizing Equations (16) and (17) representing the intercooler model M5, the throttle-passing air flow rate mt(k−1) obtained in the above-described Step 1505, and the compressor flow-out air flow rate mcm(k−1) and compressor-imparting energy Ecm(k−1) obtained in the above-described Step 1220 of FIG. 12. Notably, At represents a time step used in the intercooler model M5, the intake pipe model M6, and the IC-intake pipe combined model M8 and is represented by an equation (Δt=t2−t1). That is, in Step 1510, the intercooler section pressure Pic(k) and intercooler section temperature Tic(k) at the present estimation time t2 are obtained from the intercooler section pressure Pic(k−1), intercooler section temperature Tic(k−1), etc. at the previous estimation time t1.

Next, the CPU 71 proceeds to Step 1515 so as to obtain the intake pipe section pressure Pm(k) at the present estimation time t2 and the value {Pm/Tm}(k), which is a value dividing the intake pipe section pressure Pm(k) by the intake pipe section temperature Tm(k) at the present estimation time t2, in accordance with Equations (27) and (28) (equations (differential equations) shown in the box of Step 1515), which are obtained by discretizing Equations (25) and (26) representing the intake pipe model M6, the throttle-passing air flow rate mt(k−1) obtained in the above-described Step 1505, the cylinder flow-in air flow rate mc(k−1) obtained in the above-described Step 1215 of FIG. 12, and the intercooler section temperature Tic(k−1) at the previous estimation time t1 obtained in the above-described Step 1510 at the time of previous execution of the present routine. That is, in Step 1515, the intake pipe section pressure Pm(k) and intake pipe section temperature Tm(k) at the present estimation time t2 are obtained from the intake pipe section pressure Pm(k−1) and intake pipe section temperature Tm(k−1), etc. at the previous estimation time t1.

Next, the CPU 71 proceeds to Step 1235 of FIG. 12 via Step 1595, and sets the value of an initialization flag Xini to “1.” The initialization flag Xini represents whether initialization is to be performed when the estimation by the IC-intake pipe combined model M8 is performed in Step 1255, which will be described later. When the value of the initialization flag Xini is “1,” the initialization is performed, and when the value of the initialization flag Xini is “0,” the initialization is not performed. As described later, the value of the initialization flag Xini is set to “0” immediately after the estimation by the IC-intake pipe combined model M8 is performed in Step 1255 of the present routine.

After that, the CPU 71 proceeds to Step 1240 so as to obtain the cylinder flow-in air flow rate mc(k) at the present estimation time t2 by use of Equation (8) representing the intake valve model M7. At this time, the coefficient c and value d obtained in the above-described Step 1215 are used. Further, for the intake pipe section pressure Pm(k) and the intake pipe section temperature Tm(k), the values (latest values) at the present estimation time t2 obtained in the above-described Step 1515 of FIG. 15 are used.

The CPU 71 then proceeds to Step 1245 of FIG. 12 so as to calculate an intake valve open time (a period of time from the point in time when the intake valve 32 opens to the point in time when the intake valve 32 closes) Tint from the engine rotational speed NE at the present point in time and the open-close timing VT of the intake valve 32 at the present point in time. In Step 1250 subsequent thereto, the CPU 71 obtains the predictive cylinder air quantity KLfwd by multiplying the cylinder flow-in air flow rate mc(k) at the present estimation time t2 by the intake valve open time Tint. The CPU 71 then proceeds to Step 1295 so as to end the current execution of the present routine. Notably, executing the processing of Steps 1240 to 1250 corresponds to accomplishing the function of the cylinder air quantity estimation means.

The predictive cylinder air quantity KLfwd calculated as descried above will be described further. Here, in order to simplify the description, there will be considered a case where the computation interval ΔTt2 of the cylinder air quantity estimation routine of FIG. 12 is sufficiently shorter than the time which the crankshaft 24 requires to rotate by 360 degrees and where the predetermined time interval Δt0 does not change greatly. In this case, the present estimation time t2 moves to a future point by an amount approximately equal to the computation interval ΔTt2 every time the above-described cylinder air quantity estimation routine is executed. When the present routine is executed at a predetermined point in time before the fuel injection start point in time of a certain cylinder (a point in time before which the quantity of fuel to be injected must be determined), the present estimation time t2 approximately coincides with the time of the end of the intake stroke (the time of closure of the intake valve 32 in the intake stroke of the cylinder). Accordingly, the predictive cylinder air quantity KLfwd calculated at this point in time serves as an estimated value of the cylinder air quantity at the end of the intake stroke.

As described above, when the predictive throttle valve opening θt(k−1) is smaller than the threshold throttle valve opening θth, the intake pipe section pressure is estimated by use of the intercooler model M5, which is constructed on the basis of the conservation laws for air within the intercooler section, and the intake pipe model M6, which is constructed on the basis of the conservation laws for air within the intake pipe section, and the cylinder air quantity is estimated on the basis of the estimated intake pipe section pressure.

Next, there will be described a case where the throttle valve opening has increased as a result of an increase in the accelerator pedal operation amount Accp and the predictive throttle valve opening θt(k−1) has exceeded the threshold throttle valve opening θth. Even when the throttle valve opening has increased, the difference between the intercooler section pressure Pic(k−1) and the intake pipe section pressure Pm(k−1) at the previous estimation time t1 is greater than the predetermined value ΔP, because a certain time (delay time) is required until the value of the intercooler section pressure and the value of the intake pipe section pressure are close to each other. Accordingly, in this case, when the CPU 71 starts the processing of the routine of FIG. 12, the CPU 71 determines that the answer in Step 1225 is "No", executes the processing of Steps 1230 to 1250 as in the above-described case, and then ends the current execution of the present routine in Step 1295.

As described above, even in the case where the predictive throttle valve opening θt(k−1) is greater than the threshold throttle valve opening θth, if the difference between the intercooler section pressure Pic(k−1) and the intake pipe section pressure Pm(k−1) is greater than the predetermined value ΔP, the intake pipe section pressure is estimated by use of the intercooler model M5, which is constructed on the basis of the conservation laws for air within the intercooler section, and the intake pipe model M6, which is constructed on the basis of the conservation laws for air within the intake pipe section, and the cylinder air quantity is estimated on the basis of the estimated intake pipe section pressure.

The description will be continued under the assumption that the difference between the intercooler section pressure Pic(k−1) and the intake pipe section pressure Pm(k−1) at the previous estimation time t1 has become smaller than the predetermined value ΔP when the point in time at which the cylinder air quantity is estimated proceeds with elapse of time. In this case, when the CPU 71 starts the processing of the routine of FIG. 12, the CPU 71 determines that the answer in Step 1225 is "Yes", and proceeds to Step 1255. In Step 1255, the CPU 71 proceeds to Step 1700 of a flowchart of FIG. 17 so as to estimate the intercooler section pressure Pic(k), intercooler section temperature Tic(k), intake pipe section pressure Pm(k), and intake pipe section temperature Tm(k) at the present estimation time t2 by use of the IC-intake pipe combined model M8. Notably, executing the routine of FIG. 17 corresponds to accomplishing the function of the second pressure estimation means.

Next, the CPU 71 proceeds to Step 1705 so as to determine whether the value of the initialization flag Xini has been set to "1." Since the initialization flag Xini has been set to "1" before the present point in time, the CPU 71 determines that the answer in Step 1705 is "Yes", and proceeds to Step 1710. In Step 1710, the CPU 71 estimates the combined section pressure Picm(k−1) and combined section temperature Ticm(k−1) at the previous estimation time t1 in accordance with the above-described Equations (33) and (34) (equations shown in the box of Step 1710), and the intercooler section pressure Pic(k−1), intercooler section temperature Tic(k−1), intake pipe section pressure Pm(k−1), and intake pipe section temperature Tm(k−1) at the previous estimation time t1 obtained in the above-described Steps 1510 and 1515 at the time of previous execution of the routine of FIG. 15.

The CPU 71 then proceeds to Step 1715 so as to estimate the combined section pressure Picm(k) at the present estimation time t2 and the value {Picm/Ticm}(k), which is a value dividing the combined section pressure Picm(k) by the combined section temperature Ticm(k) at the present estimation time t2, in accordance with Equations (31) and (32) (equations (differential equations) shown in the box of Step 1715), which are obtained by discretizing Equations (29) and (30) representing the IC-intake pipe combined model M8, the combined section pressure Picm(k−1) and combined section temperature Ticm(k−1) estimated in the above-described Step 1710, and the cylinder flow-in air flow rate mc(k−1), compressor flow-out air flow rate mcm(k−1) and compressor-imparting energy Ecm(k−1) obtained in the above-described Steps 1215 and 1220 of FIG. 12. That is, in Step 1715, the combined section pressure Picm(k) and combined section temperature Ticm(k) at the present estimation time t2 are obtained from the combined section pressure Picm(k−1), combined section temperature Ticm(k−1), etc. at the previous estimation time t1.

Next, the CPU 71 proceeds to Step 1720 so as to store the combined section pressure Picm(k) at the present estimation time t2, obtained in the above-describe Step 1715, in memory locations for the intercooler section pressure Pic(k) and intake pipe section pressure Pm(k) at the present estimation time t2, and store the combined section temperature Ticm(k) at the present estimation time t2, obtained in the above-describe Step 1715, in memory locations for the intercooler section temperature Tic(k) and intake pipe section temperature Tm(k) at the present estimation time t2. In other words, through execution of the processing of Steps 1715 and 1720, the CPU 71 estimates the combined section pressure Picm(k) at the present estimation time t2 as the intercooler section pressure Pic(k) and intake pipe section pressure Pm(k) at the present estimation time t2, and estimates the combined section temperature Ticm(k) at the present estimation time t2 as the intercooler section temperature Tic(k) and intake pipe section temperature Tm(k) at the present estimation time t2.

After that, the CPU 71 proceeds to Step 1260 of FIG. 12 via Step 1795, and sets the value of the initialization flag Xini to "0." Subsequently, in the same manner as in the previously described case, the CPU 71 executes the processing of Steps 1240 to 1250 so as to estimate the cylinder air quantity at the present estimation time t2. The CPU 71 then proceeds to Step 1295 and ends the current execution of the present routine.

As described above, in the case where the predictive throttle valve opening θt(k−1) is greater than the threshold throttle valve opening θth and where the difference between the intercooler section pressure Pic(k−1) and the intake pipe section pressure Pm(k−1) is smaller than the predetermined value ΔP, the intake pipe section pressure is estimated by use of the IC-intake pipe combined model M8, which is constructed on the basis of the conservation laws for air within the combined section, and the cylinder air quantity is estimated on the basis of the estimated intake pipe section pressure.

Figure 17:
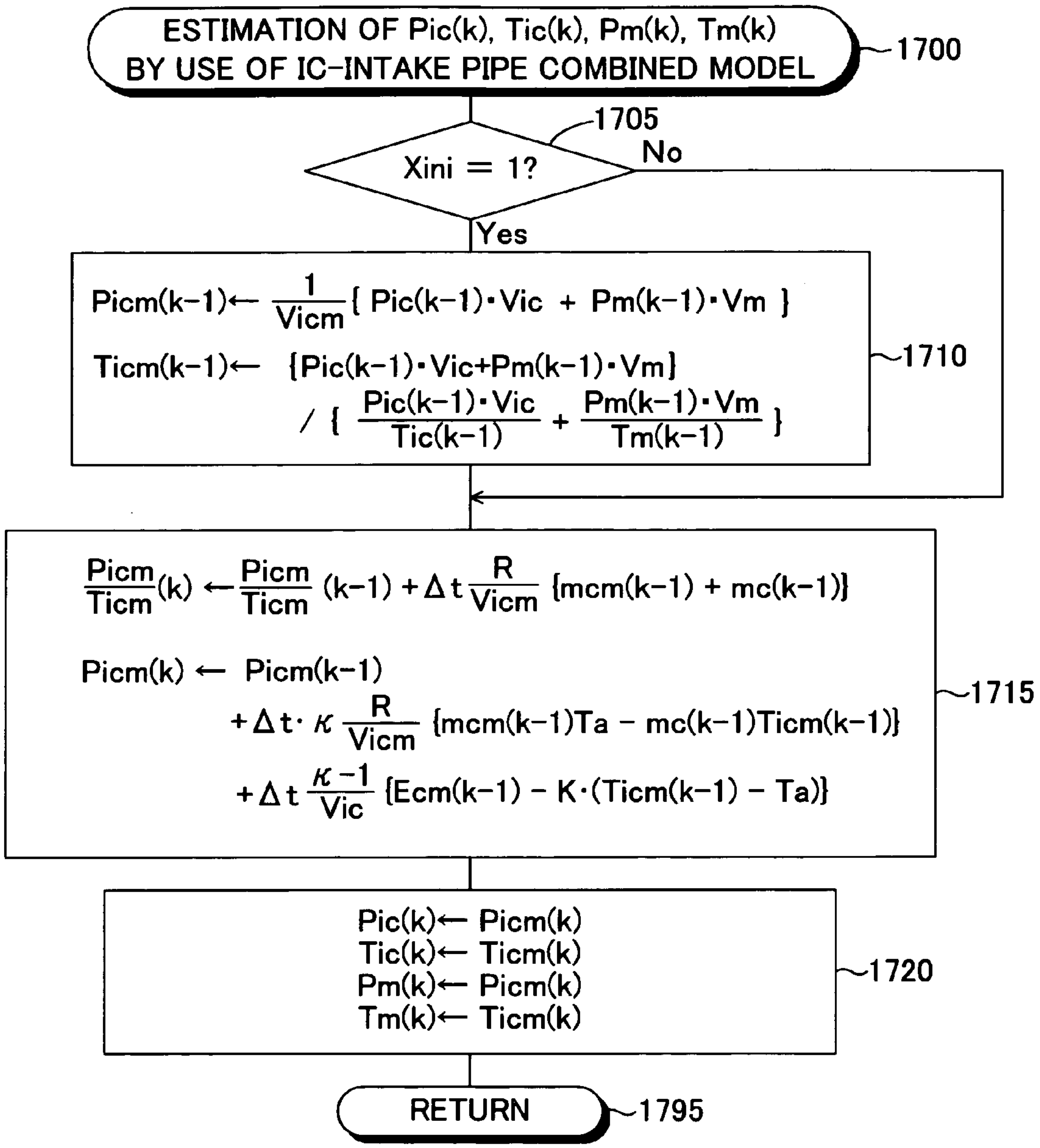
FIG. 17 is a flowchart showing a program that the CPU shown in FIG. 2 executes so as to estimate the intercooler section pressure, intercooler section temperature, intake pipe section pressure, and intake pipe section temperature by use of an intercooler-intake pipe combined model.

Next, when the CPU 71 again starts the processing of the routine of FIG. 12 after elapse of the computation interval ΔTt2, the CPU 71 determines that the answer in Step 1225 is "Yes", proceeds to Step 1700 of FIG. 17 via Step 1255, and then proceeds to Step 1705. Since the value of the initialization flag Xini has been set to "0" before the present point in time, the CPU 71 determines that the answer in Step 1705 is "No", and then proceeds to Step 1715 and steps subsequent thereto. Thus, the CPU 71 estimates the intercooler section pressure Pic(k), intake pipe section pressure Pm(k), intercooler section temperature Tic(k), and intake pipe section temperature Tm(k) at the present estimation time t2. Moreover, the CPU 71 proceeds to Step 1260 and subsequent steps of the routine of FIG. 12 to thereby estimate the cylinder air quantity at the present estimation time t2.

As described above, the air quantity estimation apparatus for an internal combustion engine 10 according to the present embodiment of the invention operates differently depending on the throttle valve opening. That is, when the throttle valve opening is smaller than the threshold throttle valve opening, the apparatus estimates the intake pipe section pressure (throttle valve downstream pressure) by use of the intercooler model (throttle valve upstream section model) M5 constructed on the basis of the conservation laws for air within the intercooler section (throttle valve upstream section) and the intake pipe model (throttle valve downstream section model) M6 constructed on the basis of the conservation laws for air within the intake pipe section (throttle valve downstream section). Meanwhile, when the throttle valve opening is greater than the threshold throttle valve opening, the apparatus estimates the intake pipe section pressure by use of the IC-intake pipe combined model (combined section model) M8 constructed on the basis of the conservation laws for air within the combined section, which is the intake passage from the supercharger 91 to the intake valve 32. Moreover, in either case, the apparatus estimates the cylinder air quantity on the basis of the estimated intake pipe section pressure.

According to this configuration, in a state in which the throttle-passing air flow rate is likely to change greatly within a short period of time with change in the intercooler section pressure or the intake pipe section pressure because of a relatively large throttle valve opening, the intake pipe section pressure can be estimated by use of the IC-intake pipe combined model M8 for which the throttle-passing air flow rate is not required to assume to be constant for a predetermined period of time. Therefore, it is possible to estimate the intake pipe section pressure accurately with avoiding an increase of calculation load. As a result, the cylinder air quantity can be estimated accurately.

Moreover, the apparatus of the present embodiment sets the threshold throttle valve opening to increase with the engine rotational speed. According to this configuration, when the throttle valve opening is greater than the threshold throttle valve opening, the difference between the intercooler section pressure and the intake pipe section pressure is sufficiently small irrespective of the engine rotational speed. Accordingly, the assumption, which is used for construction of the IC-intake pipe combined model M8, that the intercooler section pressure and the intake pipe section pressure are substantially equal to each other is satisfied, and thus the intake pipe section pressure can be estimated accurately by use of the IC-intake pipe combined model M8.

In addition, the apparatus of the present embodiment uses the IC-intake pipe combined model M8 only when the difference between the intercooler section pressure and the intake pipe section pressure is smaller than a predetermined value. Accordingly, the IC-intake pipe combined model M8 is used only when the above-described assumption is satisfied, and thus the intake pipe section pressure can be estimated more accurately.

Although one embodiment of the present invention has been described above, the present invention is not limited to the embodiment, and may be modified in various manners without departing from the scope of the present invention. In the above-described embodiment, the delay time TD is constant. However, the delay time may be a time which varies with the engine rotational speed NE, such as a time T270, which the engine 10 requires to rotate the crankshaft 24 by a predetermined crank angle (e.g., 270 degrees in crank angle).

In the above-described embodiment, the intercooler 45 is of an air-cooling type. However, the intercooler 45 may be of a water-cooling type in which air flowing through the intake passage is cooled by circulated cooling water. In this case, the air quantity estimation apparatus may be equipped with a water temperature sensor for detecting the temperature Tw of the cooling water, and may be configured to obtain the energy (heat exchange energy) exchanged between air within the intercooler 45 and the wall of the intercooler 45 on the basis of the temperature Tw of the cooling water detected by the water temperature sensor. That is, in the intercooler model M5, the following Equation (43) is used instead of the above-described Equation (17), and in the IC-intake pipe combined model M8, the following Equation (44) is used instead of the above-described Equation (26).

$$dPic/dt=\kappa\cdot(R/Vic)\cdot(mcm\cdot Ta-mt\cdot Tic)+(\kappa-1)/(Vic)\cdot(Ecm-K\cdot(Tic-Tw)) \quad (43)$$

$$dPicm/dt=\kappa\cdot(R/Vicm)\cdot(mcm\cdot Ta-mc\cdot Ticm)+(\kappa-1)/(Vicm)\cdot(Ecm-K\cdot(Ticm-Tw)) \quad (44)$$

Furthermore, in the above-described embodiment, the supercharger is of a turbo type; however, the supercharger may be of a mechanical type or an electric type.

What is claimed is:

1. An air quantity estimation apparatus for an internal combustion engine including an intake passage for introducing air taken from the outside of the engine into a cylinder; a supercharger disposed in the intake passage and including a compressor for compressing air within the intake passage; a throttle valve disposed in the intake passage to be located downstream of the supercharger, the opening of the throttle valve being adjustable for changing the quantity of air passing through the intake passage; and an intake valve disposed downstream of the throttle valve and driven to make a connection portion between the intake passage and the cylinder into a communicating state or a blocked state, the air quantity estimation apparatus estimating cylinder air quantity, which is a quantity of air introduced into the cylinder, on the basis of a physical model representing the behavior of air passing through the intake passage, the air quantity estimation apparatus comprising:

first pressure estimation means for estimating throttle valve upstream pressure as pressure of air within a throttle valve upstream section, which is a portion of the intake passage between the supercharger and the throttle valve, and estimating throttle valve downstream pressure as pressure of air within a throttle valve downstream section, which is a portion of the intake passage between the throttle valve and the intake valve, the estimations being performed by use of a throttle valve upstream section model, which is a physical model constructed on the basis of conservation laws for air within the throttle valve upstream section, and a throttle valve downstream section model, which is a physical model constructed on the basis of conservation laws for air within the throttle valve downstream section;

second pressure estimation means for estimating, as the throttle valve upstream pressure and the throttle valve downstream pressure, combined section pressure as pressure of air within a combined section, which is a portion of the intake passage between the supercharger and the intake valve, the estimation being performed by use of a combined section model, which is a physical model constructed on the basis of conservation laws for air within the combined section;

selection condition determination means for determining whether selection conditions are satisfied, including a throttle valve opening condition that opening of the throttle valve is greater than a predetermined threshold throttle valve opening; and cylinder air quantity estimation means for estimating the cylinder air quantity on the basis of the throttle valve downstream pressure estimated by means of the first pressure estimation means when the selection conditions are not satisfied, and estimating the cylinder air quantity on the basis of the throttle valve downstream pressure estimated by means of the second pressure estimation means when the selection conditions are satisfied.

2. The air quantity estimation apparatus according to claim 1, wherein the threshold throttle valve opening is set to increase with the engine rotational speed.

3. The air quantity estimation apparatus according to claim 2, wherein the selection conditions include a pressure difference condition that the difference between the throttle valve upstream pressure and the throttle valve downstream pressure is smaller than a predetermined value.

4. The air quantity estimation apparatus according to claim 1, wherein the selection conditions include a pressure difference condition that the difference between the throttle valve upstream pressure and the throttle valve downstream pressure is smaller than a predetermined value.

5. An air quantity estimation apparatus for an internal combustion engine including an intake passage for introducing air taken from the outside of the engine into a cylinder; a supercharger disposed in the intake passage and including a compressor for compressing air within the intake passage; a throttle valve disposed in the intake passage to be located downstream of the supercharger, the opening of the throttle valve being adjustable for changing the quantity of air passing through the intake passage; and an intake valve disposed downstream of the throttle valve and driven to make a connection portion between the intake passage and the cylinder into a communicating state or a blocked state, the air quantity estimation apparatus estimating cylinder air quantity, which is a quantity of air introduced into the cylinder, on the basis of a physical model representing the behavior of air passing through the intake passage, the air quantity estimation apparatus comprising:

throttle valve opening estimation means for estimating an opening of the throttle valve at a predetermined first point in time;

throttle-passing air flow rate estimation means for estimating throttle-passing air flow rate, which is flow rate of air flowing from a throttle valve upstream section to a throttle valve downstream section while passing around the throttle valve, at the first point in time, on the basis of throttle valve upstream pressure, which is pressure of air within the throttle valve upstream section, at the first point in time, throttle valve downstream pressure, which is pressure of air within the throttle valve downstream section, at the first point in time, and the estimated opening of the throttle valve at the first point in time, wherein the throttle valve upstream section is a portion of the intake passage between the supercharger and the throttle valve and the throttle valve downstream section is a portion of the intake passage between the throttle valve and the intake valve;

first pressure estimation means for estimating throttle valve upstream pressure and throttle valve downstream pressure at a second point in time later than the first point in time by use of the estimated throttle-passing air flow rate at the first point in time; a throttle valve upstream section model, which is a physical model constructed on the basis of conservation laws for air within the throttle valve upstream section; a throttle valve downstream section model, which is a physical model constructed on the basis of conservation laws for air within the throttle valve downstream section; the throttle valve upstream pressure at the first point in time; and the throttle valve downstream pressure at the first point in time;

second pressure estimation means for estimating combined section pressure as pressure of air within a combined section, which is a portion of the intake passage between the supercharger and the intake valve, at the first point in time on the basis of the throttle valve upstream pressure at the first point in time and the throttle valve downstream pressure at the first point in time, and estimating, as the throttle valve upstream pressure and throttle valve downstream pressure at the second point in time, the combined section pressure at the second point in time on the basis of the estimated combined section pressure at the first point in time and a combined section model, which is a physical model constructed on the basis of conservation laws for air within the combined section under the assumption that the combined section pressure is uniform within the combined section;

selection condition determination means for determining whether selection conditions are satisfied, including a throttle valve opening condition that the estimated opening of the throttle valve at the first point in time is greater than a predetermined threshold throttle valve opening; and cylinder air quantity estimation means for estimating a cylinder air quantity at the second point in time on the basis of the throttle valve downstream pressure at the second point in time estimated by means of the first pressure estimation means when the selection conditions are not satisfied, and estimating the cylinder air quantity at the second point in time on the basis of the throttle valve downstream pressure at the second point in time estimated by means of the second pressure estimation means when the selection conditions are satisfied.

6. The air quantity estimation apparatus according to claim 5, wherein the threshold throttle valve opening is set to increase with the engine rotational speed.

7. The air quantity estimation apparatus according to claim 6, wherein the selection conditions include a pressure difference condition that the difference between the throttle valve upstream pressure and the throttle valve downstream pressure is smaller than a predetermined value.

8. The air quantity estimation apparatus according to claim 5, wherein the selection conditions include a pressure difference condition that the difference between the throttle valve upstream pressure and the throttle valve downstream pressure is smaller than a predetermined value.

* * * * *